(12) United States Patent
Martin

(10) Patent No.: US 12,078,385 B2
(45) Date of Patent: Sep. 3, 2024

(54) HEAT DISSIPATION SYSTEMS WITH HYGROSCOPIC WORKING FLUID

(71) Applicant: Energy and Environmental Research Center Foundation, Grand Forks, ND (US)

(72) Inventor: Christopher Lee Martin, Grand Forks, ND (US)

(73) Assignee: Energy and Environmental Research Center Foundation, Grand Forks, ND (US)

( * ) Notice: Subject to any disclaimer, the term of this patent is extended or adjusted under 35 U.S.C. 154(b) by 228 days.

(21) Appl. No.: 17/020,718

(22) Filed: Sep. 14, 2020

(65) Prior Publication Data

US 2021/0123616 A1 Apr. 29, 2021

Related U.S. Application Data

(63) Continuation of application No. 14/884,450, filed on Oct. 15, 2015, now Pat. No. 10,808,948, which is a (Continued)

(51) Int. Cl.
*F24F 3/14* (2006.01)
*F02C 7/143* (2006.01)
(Continued)

(52) U.S. Cl.
CPC ............ *F24F 3/1417* (2013.01); *F02C 7/143* (2013.01); *F25B 25/00* (2013.01); *F28B 9/06* (2013.01);
(Continued)

(58) Field of Classification Search
CPC .................... F28F 2025/005; F24F 2003/1446
See application file for complete search history.

(56) References Cited

U.S. PATENT DOCUMENTS

| 874,858 A | 12/1907 | McGowan |
| 2,057,938 A | 10/1936 | Crawford |

(Continued)

FOREIGN PATENT DOCUMENTS

| CA | 2919236 | 2/2021 |
| CN | 105579804 A | 5/2016 |

(Continued)

OTHER PUBLICATIONS

U.S. Appl. No. 13/040,379, filed Mar. 4, 2011, Heat Dissipation Systems With Hygroscopic Working Fluid.

(Continued)

*Primary Examiner* — Christopher R Zerphey
(74) *Attorney, Agent, or Firm* — Schwegman Lundberg & Woessner, P.A.

(57) ABSTRACT

In various embodiments, the present invention relates to heat dissipation systems including a hygroscopic working fluid and methods of using the same. In various embodiments, the present invention provides a method for heat dissipation using a hygroscopic working fluid. The method can include transferring thermal energy from a heated process fluid to the hygroscopic working fluid in a process heat exchanger, to form a cooled process fluid. The method can include condensing liquid from a feed gas on a heat transfer surface of a feed gas heat exchanger in contact with the cooled process fluid, to form a cooled feed gas, the heated process fluid, and a condensate. The method can include dissipating thermal energy from the hygroscopic working fluid to a cooling gas composition with a fluid-air contactor. The method can include transferring moisture between the hygroscopic working fluid and the cooling gas composition with the fluid-air contactor. The method can include adding at least part of the condensate to the hygroscopic working fluid.

22 Claims, 14 Drawing Sheets

Related U.S. Application Data continuation-in-part of application No. 13/953,332, filed on Jul. 29, 2013, now Pat. No. 10,260,761, which is a continuation-in-part of application No. 13/040,379, filed on Mar. 4, 2011, now abandoned.

(60) Provisional application No. 61/345,864, filed on May 18, 2010.

(51) Int. Cl.
| | |
|---|---|
| *F25B 25/00* | (2006.01) |
| *F28B 9/06* | (2006.01) |
| *F28C 1/00* | (2006.01) |
| *F28C 1/02* | (2006.01) |
| *F28C 1/04* | (2006.01) |
| *F28C 1/16* | (2006.01) |
| *F28C 3/08* | (2006.01) |
| *F28D 20/00* | (2006.01) |
| *F28F 23/02* | (2006.01) |
| *F28F 25/02* | (2006.01) |
| *F28F 25/08* | (2006.01) |

(52) U.S. Cl.
CPC .................. *F28C 1/02* (2013.01); *F28C 1/04* (2013.01); *F28C 3/08* (2013.01); *F28D 20/0034* (2013.01); *F28F 23/02* (2013.01); *F28F 25/087* (2013.01); *F28C 2001/006* (2013.01); *F28C 1/16* (2013.01); *F28F 25/02* (2013.01)

(56) References Cited

U.S. PATENT DOCUMENTS

| | | | |
|---|---|---|---|
| 2,143,007 A | 1/1939 | Heath et al. | |
| 2,162,158 A | 6/1939 | Clark | |
| 2,262,954 A | 11/1941 | Mattern et al. | |
| 2,279,938 A | 4/1942 | Crawford | |
| 2,355,828 A | 8/1944 | Taylor | |
| 2,525,045 A | 10/1950 | Richardson | |
| 2,732,192 A * | 1/1956 | Johnson et al. | F28C 1/00 261/78.2 |
| 3,423,078 A * | 1/1969 | May | F28B 3/04 261/138 |
| 3,473,298 A | 10/1969 | Berman | |
| 3,635,042 A | 1/1972 | Spangemacher | |
| 3,666,246 A | 5/1972 | Cohen | |
| 4,007,241 A | 2/1977 | Phelps | |
| 4,121,541 A * | 10/1978 | Kneissl | B01D 47/00 261/DIG. 77 |
| 4,182,131 A | 1/1980 | Marshall et al. | |
| 4,287,721 A * | 9/1981 | Robison | F28D 20/003 261/153 |
| 4,340,572 A | 7/1982 | Ben-Shmuel et al. | |
| 4,355,683 A | 10/1982 | Griffiths | |
| 4,361,524 A | 11/1982 | Howlett | |
| 4,380,910 A * | 4/1983 | Hood | F24F 1/0087 62/304 |
| 4,418,527 A * | 12/1983 | Schlom | F02C 7/1435 60/39.53 |
| 4,464,315 A | 8/1984 | Oleary | |
| 4,662,902 A | 5/1987 | Meyer-Pittroff | |
| 4,723,417 A | 2/1988 | Meckler | |
| 4,819,447 A | 4/1989 | Assaf | |
| 4,841,740 A | 6/1989 | Assaf | |
| 4,931,187 A | 6/1990 | Derham et al. | |
| 4,936,881 A | 6/1990 | Jorzyk et al. | |
| 4,984,434 A | 1/1991 | Peterson et al. | |
| 5,022,241 A | 6/1991 | Wilkinson | |
| 5,024,062 A | 6/1991 | Hellman | |
| 5,145,585 A | 9/1992 | Coke | |
| 5,193,352 A * | 3/1993 | Smith | F02C 7/143 62/201 |
| 5,203,161 A * | 4/1993 | Lehto | F02C 7/143 95/231 |
| 5,206,002 A | 4/1993 | Skelley et al. | |
| 5,351,497 A | 10/1994 | Lowenstein | |
| 5,407,606 A * | 4/1995 | Bowman | F28C 1/02 261/DIG. 11 |
| 5,450,731 A * | 9/1995 | DiPeri | F24F 1/0007 62/97 |
| 5,790,972 A * | 8/1998 | Kohlenberger | F25B 41/00 701/104 |
| 5,884,492 A | 3/1999 | Zwicky et al. | |
| 6,134,903 A | 10/2000 | Potnis et al. | |
| 6,183,646 B1 | 2/2001 | Williams et al. | |
| 6,385,987 B2 * | 5/2002 | Schlom | F24F 1/0063 62/304 |
| 6,394,174 B1 * | 5/2002 | Hsieh | F28C 1/08 165/47 |
| 6,485,547 B1 | 11/2002 | Iijima | |
| 6,595,011 B1 | 7/2003 | Forgy | |
| 6,769,258 B2 * | 8/2004 | Pierson | F01K 23/10 62/175 |
| 6,854,278 B2 | 2/2005 | Maisotsenko et al. | |
| 6,855,257 B2 | 2/2005 | Bonds et al. | |
| 7,210,671 B2 | 5/2007 | Bosman | |
| 7,269,966 B2 | 9/2007 | Lowenstein et al. | |
| 7,343,746 B2 * | 3/2008 | Pierson | F24F 3/06 60/772 |
| 7,360,375 B2 | 4/2008 | Mola et al. | |
| 7,823,396 B2 | 11/2010 | Al-Mayahi et al. | |
| 8,223,495 B1 * | 7/2012 | Carlson | F28D 15/00 361/752 |
| RE44,815 E | 3/2014 | Pierson | |
| 9,045,351 B2 | 6/2015 | Wallace | |
| 9,927,178 B1 | 3/2018 | Srinivas et al. | |
| 10,260,761 B2 | 4/2019 | Martin | |
| 10,782,036 B2 | 9/2020 | Martin | |
| 10,808,948 B2 * | 10/2020 | Martin | F24F 3/1417 |
| 10,845,067 B2 * | 11/2020 | Martin | F28B 9/06 |
| 2001/0032477 A1 | 10/2001 | Schlom et al. | |
| 2002/0020185 A1 | 2/2002 | Carr | |
| 2004/0112077 A1 | 6/2004 | Forkosh et al. | |
| 2004/0261440 A1 | 12/2004 | Forkosh et al. | |
| 2005/0056042 A1 | 3/2005 | Bourne et al. | |
| 2005/0109052 A1 | 5/2005 | Albers et al. | |
| 2007/0101746 A1 | 5/2007 | Schlom et al. | |
| 2008/0173032 A1 | 7/2008 | Kammerzell et al. | |
| 2008/0307802 A1 * | 12/2008 | Forkosh | B01D 53/261 62/271 |
| 2009/0090488 A1 | 4/2009 | McCann | |
| 2009/0277841 A1 | 11/2009 | Johnson et al. | |
| 2009/0301114 A1 | 12/2009 | Rowley et al. | |
| 2010/0126939 A1 | 5/2010 | Nakano et al. | |
| 2011/0101549 A1 * | 5/2011 | Miyauchi | F24F 3/1417 261/153 |
| 2011/0278226 A1 * | 11/2011 | Nicoll | B01D 61/027 210/639 |
| 2011/0283718 A1 | 11/2011 | Ueda | |
| 2011/0283720 A1 | 11/2011 | Martin | |
| 2012/0255908 A1 | 10/2012 | Duke et al. | |
| 2013/0213888 A1 * | 8/2013 | Tempest, Jr. | C02F 9/00 210/639 |
| 2013/0220581 A1 | 8/2013 | Herron et al. | |
| 2013/0305752 A1 | 11/2013 | Martin | |
| 2015/0292754 A1 | 10/2015 | Mongar | |
| 2016/0033192 A1 | 2/2016 | Martin | |
| 2017/0268815 A1 | 9/2017 | Martin | |
| 2018/0202671 A1 | 7/2018 | Martin | |
| 2020/0363079 A1 | 11/2020 | Martin | |
| 2020/0370767 A1 | 11/2020 | Martin | |

FOREIGN PATENT DOCUMENTS

| | | | |
|---|---|---|---|
| EP | 0051893 | A1 | 5/1982 |
| EP | 3156751 | A1 | 4/2017 |
| EP | 3156751 | B1 | 6/2018 |
| EP | 3415851 | B1 | 1/2020 |
| EP | 3027972 | | 1/2022 |
| EP | 3553452 | | 3/2022 |

(56) References Cited

FOREIGN PATENT DOCUMENTS

| IN | 201617002792 A | 8/2016 |
|---|---|---|
| JP | 2009287795 A | 12/2009 |
| WO | WO-2015017144 A2 | 2/2015 |
| WO | WO-2015017144 A3 | 2/2015 |

OTHER PUBLICATIONS

U.S. Appl. No. 61/345,864, filed May 18, 2010, Heat Dissipation Systems With Hygroscopic Working Fluid.

U.S. Appl. No. 13/953,332, U.S. Pat. No. 10,260,761, filed Jul. 29, 2013, Heat Dissipation Systems With Hygroscopic Working Fluid.

U.S. Appl. No. 15/617,619, U.S. Pat. No. 10,782,036, filed Jun. 8, 2017, Heat Dissipation Systems With Hygroscopic Working Fluid.

U.S. Appl. No. 16/983,434, filed Aug. 3, 2020, Heat Dissipation Systems With Hygroscopic Working Fluid.

U.S. Appl. No. 14/884,450, U.S. Pat. No. 10,808,948, filed Oct. 15, 2015, Heat Dissipation Systems With Hygroscopic Working Fluid.

U.S. Appl. No. 15/918,916, U.S. Pat. No. 10,845,067, filed Mar. 12, 2018, Hygroscopic Cooling Tower for Waste Water Disposal.

U.S. Appl. No. 16/989,994, filed Aug. 11, 2020, Hygroscopic Cooling Tower for Waste Water Disposal.

"U.S. Appl. No. 16/983,434, Restriction Requirement mailed May 12, 2022", 6 pgs.

"U.S. Appl. No. 16/989,994, Restriction Requirement mailed May 12, 2022", 6 pgs.

"U.S. Appl. No. 16/989,994, Response filed May 26, 2022 to Restriction Requirement mailed May 12, 2022", 3 pgs.

"U.S. Appl. No. 16/983,434, Response filed Jun. 15, 2022 to Restriction Requirement mailed May 12, 2022", 3 pgs.

"U.S. Appl. No. 13/953,332 Response filed Aug. 21, 2018 to Final Office Action mailed May 25, 2018", 21 pgs.

"U.S. Appl. No. 13/953,332, Advisory Action mailed May 30, 2017", 6 pgs.

"U.S. Appl. No. 13/953,332, Advisory Action mailed Aug. 6, 2018", 3 pgs.

"U.S. Appl. No. 13/953,332, Advisory Action mailed Nov. 2, 2015", 4 pgs.

"U.S. Appl. No. 13/953,332, Corrected Notice of Allowability mailed Jan. 3, 2019", 5 pgs.

"U.S. Appl. No. 13/953,332, Examiner Interview Summary mailed Apr. 4, 2016", 3 pgs.

"U.S. Appl. No. 13/953,332, Examiner Interview Summary mailed Jul. 18, 2018", 3 pgs.

"U.S. Appl. No. 13/953,332, Final Office Action mailed Mar. 21, 2017", 10 pgs.

"U.S. Appl. No. 13/953,332, Final Office Action mailed May 25, 2018", 17 pgs.

"U.S. Appl. No. 13/953,332, Final Office Action mailed Aug. 31, 2015", 9 pgs.

"U.S. Appl. No. 13/953,332, Final Office Action mailed Oct. 12, 2017", 10 pgs.

"U.S. Appl. No. 13/953,332, Non Final Office Action mailed Jan. 30, 2018", 17 pgs.

"U.S. Appl. No. 13/953,332, Non Final Office Action mailed May 29, 2015", 9 pgs.

"U.S. Appl. No. 13/953,332, Non Final Office Action mailed Jul. 6, 2017", 12 pgs.

"U.S. Appl. No. 13/953,332, Non Final Office Action mailed Dec. 12, 2016", 10 pgs.

"U.S. Appl. No. 13/953,332, Notice of Allowance mailed Nov. 28, 2018", 8 pgs.

"U.S. Appl. No. 13/953,332, Response filed Jan. 8, 2018 to Final Office Action mailed Oct. 12, 2017", 19 pgs.

"U.S. Appl. No. 13/953,332, Response filed Mar. 9, 2017 to Non Final Office Action mailed Dec. 12, 2016", 13 pgs.

"U.S. Appl. No. 13/953,332, Response filed May 15, 2015 to Restriction Requirement mailed Apr. 14, 2015", 8 pgs.

"U.S. Appl. No. 13/953,332, Response filed May 18, 2017 to Final Office Action mailed Mar. 21, 2017", 13 pgs.

"U.S. Appl. No. 13/953,332, Response filed Jun. 19, 2017 to Advisory Action mailed May 30, 2017", 12 pgs.

"U.S. Appl. No. 13/953,332, Response filed Aug. 19, 2015 to Non Final Office Action mailed May 29, 2015", 12 pgs.

"U.S. Appl. No. 13/953,332, Response filed Sep. 28, 2017 to Non Final Office Action mailed Jul. 6, 2017", 14 pgs.

"U.S. Appl. No. 13/953,332, Response filed Oct. 23, 2015 to Final Office Action mailed Aug. 31, 2015", 11 pgs.

"U.S. Appl. No. 13/953,332, Response filed Nov. 4, 2015 to Final Office Action mailed Aug. 31, 2015", 11 pgs.

"U.S. Appl. No. 13/953,332, Response filed Apr. 25, 2018 to Non-Final Office Action mailed Jan. 30, 2018", 18 pgs.

"U.S. Appl. No. 13/953,332, Response filed Jul. 23, 2018 to Final Office Action mailed May 25, 2018", 21 pgs.

"U.S. Appl. No. 13/953,332, Restriction Requirement mailed Apr. 14, 2015", 6 pgs.

"U.S. Appl. No. 14/884,450, Advisory Action mailed Mar. 21, 2018", 5 pgs.

"U.S. Appl. No. 14/884,450, Examiner Interview Summary mailed Feb. 27, 2018", 3 pgs.

"U.S. Appl. No. 14/884,450, Examiner Interview Summary mailed Nov. 26, 2018", 4 pgs.

"U.S. Appl. No. 14/884,450, Final Office Action mailed Sep. 5, 2018", 17 pgs.

"U.S. Appl. No. 14/884,450, Final Office Action mailed Oct. 7, 2019", 16 pgs.

"U.S. Appl. No. 14/884,450, Final Office Action mailed Dec. 29, 2017", 20 pgs.

"U.S. Appl. No. 14/884,450, Non Final Office Action mailed Feb. 12, 2020", 18 pgs.

"U.S. Appl. No. 14/884,450, Non Final Office Action mailed Apr. 16, 2018", 17 pgs.

"U.S. Appl. No. 14/884,450, Non Final Office Action mailed May 17, 2019", 19 pgs.

"U.S. Appl. No. 14/884,450, Non Final Office Action mailed Sep. 13, 2017", 16 pgs.

"U.S. Appl. No. 14/884,450, Notice of Allowance mailed Jun. 15, 2020", 8 pgs.

"U.S. Appl. No. 14/884,450, Response filed Jan. 3, 2020 to Final Office Action mailed Oct. 7, 2019", 14 pgs.

"U.S. Appl. No. 14/884,450, Response filed May 11, 2020 to Non Final Office Action mailed Feb. 12, 2020", 15 pgs.

"U.S. Appl. No. 14/884,450, Response filed Jul. 11, 2018 to Non-Final Office Action mailed Apr. 16, 2018", 28 pgs.

"U.S. Appl. No. 14/884,450, Response filed Aug. 23, 2017 to Restriction Requirement mailed Jul. 5, 2017", 8 pgs.

"U.S. Appl. No. 14/884,450, Response filed Dec. 13, 2017 to Non Final Office Action mailed Sep. 13, 2017", 16 pgs.

"U.S. Appl. No. 14/884,450, Response filed Dec. 5, 2018 to Final Office Action mailed Sep. 5, 2018", 13 pgs.

"U.S. Appl. No. 14/884,450, Response filed Aug. 16, 2019 to Non-Final Office Action mailed May 17, 2019", 14 pgs.

"U.S. Appl. No. 14/884,450, Restriction Requirement mailed Jul. 5, 2017", 6 pgs.

"U.S. Appl. No. 14/844,450, Response filed Mar. 29, 2018 to Advisory Action mailed Mar. 21, 2018", 14 pgs.

"U.S. Appl. No. 14/884,450, Response filed Feb. 27, 2018 to Final Office Action mailed Dec. 29, 2017.pdf", 14 pgs.

"U.S. Appl. No. 15/617,619, 312 Amendment filed Jun. 26, 2020", 3 pgs.

"U.S. Appl. No. 15/617,619, Advisory Action mailed Mar. 31, 2020", 3 pgs.

"U.S. Appl. No. 15/617,619, Final Office Action mailed Jan. 24, 2019", 17 pgs.

"U.S. Appl. No. 15/617,619, Final Office Action mailed Feb. 3, 2020", 11 pgs.

"U.S. Appl. No. 15/617,619, Non Final Office Action mailed Sep. 21, 2018", 13 pgs.

"U.S. Appl. No. 15/617,619, Non Final Office Action mailed Oct. 28, 2019", 10 pgs.

(56) References Cited

OTHER PUBLICATIONS

"U.S. Appl. No. 15/617,619, Notice of Allowance mailed Apr. 21, 2020", 8 pgs.
"U.S. Appl. No. 15/617,619, Response filed Jan. 20, 2020 to Non Final Office Action mailed Oct. 28, 2019", 15 pgs.
"U.S. Appl. No. 15/617,619, Response filed Mar. 19, 2020 to Final Office Action mailed Feb. 3, 2020", 15 pgs.
"U.S. Appl. No. 15/617,619, Response filed Sep. 4, 2018 to Restriction Requirement mailed Aug. 2, 2018.pdf", 9 pgs.
"U.S. Appl. No. 15/617,619, Response filed Dec. 4, 2018 to Non Final Office Action mailed Sep. 21, 2018", 15 pgs.
"U.S. Appl. No. 15/617,619, Response filed Mar. 27, 2019 to Final Office Action mailed Jan. 24, 2019", 23 pgs.
"U.S. Appl. No. 15/617,619, Restriction Requirement mailed Aug. 2, 2018", 6 pgs.
"U.S. Appl. No. 15/918,916, Non Final Office Action mailed Mar. 24, 2020", 8 pgs.
"U.S. Appl. No. 15/918,916, Notice of Allowance mailed Jul. 21, 2020", 8 pgs.
"U.S. Appl. No. 15/918,916, Response filed Mar. 12, 2020 to Restriction Requirement mailed Feb. 25, 2020", 2 pgs.
"U.S. Appl. No. 15/918,916, Response filed Jun. 24, 2020 to Non Final Office Action mailed Mar. 24, 2020", 12 pgs.
"U.S. Appl. No. 15/918,916, Restriction Requirement mailed Feb. 25, 2020", 6 pgs.
"U.S. Appl. No. 16/983,434, Preliminary Amendment filed Aug. 4, 2020", 7 pgs.
"Canadian Application Serial No. 2,919,236, Office Action mailed Jul. 3, 2020", 3 pgs.
"Canadian Application Serial No. 2,919,236, Response filed Aug. 28, 2020 to Office Action mailed Jul. 3, 2020", 18 pgs.
"Chinese Application Serial No. 201480053735.9, Notice of Reexamination mailed Feb. 18, 2019", w/English Translation, 14 pgs.
"Chinese Application Serial No. 201480053735.9, Notice of Reexamination mailed Jul. 31, 2019", w/ English language summary, 4 pgs.
"Chinese Application Serial No. 201480053735.9, Office Action mailed Mar. 1, 2017", (English Translation), 15 pgs.
"Chinese Application Serial No. 201480053735.9, Office Action mailed Sep. 19, 2017", With English Translation, 11 pgs.
"Chinese Application Serial No. 201480053735.9, Office Action Response mailed Jul. 3, 2017", w/English Claims, 12 pgs.
"Chinese Application Serial No. 201480053735.9, Response filed Apr. 3, 2019 to Notice of Reexamination mailed Feb. 18, 2019", w/English Claims, 15 pgs.
"Chinese Application Serial No. 201480053735.9, Response filed Sep. 4, 2019 to Notice of Reexamination mailed Jul. 31, 2019", w/ English Claims, 14 pgs.
"Chinese Application Serial No. 201480053735.9, Response filed Nov. 21, 2017 to Office Action mailed Sep. 19, 2017", W/English Claims, 14 pgs.
"Chinese Application Serial No. 20148005373539, Voluntary Amendment filed Jun. 15, 2016", 10 pgs.
"European Application Serial No. 19161740.6, Response filed May 22, 2019 to Invitation to Remedy Deficiencies mailed Mar. 28, 2019", 5 pgs.
"European Application Serial No. 14748054.5, Communication Pursuant to Article 94(3) EPC mailed Feb. 9, 2018", 5 pgs.
"European Application Serial No. 14748054.5, Communication Pursuant to Article 94(3) EPC mailed Oct. 10, 2018", 3 pgs.
"European Application Serial No. 14748054.5, Communication Pursuant to Article 94(3) EPC mailed Dec. 4, 2019", 5 pgs.
"European Application Serial No. 14748054.5, Response filed Feb. 15, 2019 to Communication Pursuant to Article 94(3) EPC mailed Oct. 10, 2018", 6 pgs.
"European Application Serial No. 14748054.5, Response filed Mar. 24, 2020 to Communication Pursuant to Article 94(3) EPC mailed Dec. 4, 2019", 6 pgs.
"European Application Serial No. 14748054.5, Response filed May 2, 2017 to Deadline to Respond to Notification to Correct Deficiency", 6 pgs.
"European Application Serial No. 14748054.5, Response filed Jun. 19, 2018 to Communication Pursuant to Article 94(3) EPC mailed Feb. 9, 2018", 14 pgs.
"European Application Serial No. 14748054.5, Response filed Sep. 8, 2016 to Communication pursuant to Rules 161(1) and 162 EPC mailed Mar. 22, 2016", 9 pgs.
"European Application Serial No. 16194035.8, Extended European Search Report mailed Mar. 6, 2017", 8 pgs.
"European Application Serial No. 16194035.8, Invitation to Remedy Deficiencies mailed Oct. 31, 2016", 1 pg.
"European Application Serial No. 16194035.8, Response filed Jan. 9, 2017 to Invitation to Remedy Deficiencies mailed Oct. 31, 2016", 4 pgs.
"European Application Serial No. 16194035.8, Response filed Oct. 10, 2017 to Extended European Search Report mailed Mar. 6, 2017", 12 pgs.
"European Application Serial No. 18172484.0, Extended European Search Report mailed Nov. 19, 2018", 6 pgs.
"European Application Serial No. 19161740.6, Extended European Search Report mailed Sep. 17, 2019", 7 pgs.
"European Application Serial No. 19161740.6, Response Filed Apr. 7, 2020 to Extended European Search Report mailed Sep. 17, 2019", 14 pgs.
"Indian Application No. 201617002792, First Examination Report Received mailed Feb. 6, 2019", w/English Translation, 6 pgs.
"International Application Serial No. PCT/US2014/047230, International Application Serial No. PCT/US2014/047230, International Preliminary Report on Patentability mailed Feb. 11, 2016", 7 pgs.
"International Application Serial No. PCT/US2014/047230, International Search Report mailed Aug. 18, 2015", 3 pgs.
"International Application Serial No. PCT/US2014/047230, Written Opinion mailed Aug. 18, 2015", 5 pgs.
Biesiadny, et al., "Contingency Power for Small Turboshaft Engines Using Water Injection into Turbine Cooling Air", NASA, Technical Report 86-C-32, (Jul. 2, 1987), 14 pgs.
"U.S. Appl. No. 16/983,434, Non Final Office Action mailed Sep. 29, 2022", 14 pgs.
"U.S. Appl. No. 16/989,994, Non Final Office Action mailed Sep. 29, 2022", 10 pgs.
"Canadian Application Serial No. 2,945,255, Examiner's Rule 86(2) Report filed Nov. 14, 2022", 3 pgs.
"U.S. Appl. No. 16/983,434, Final Office Action mailed Jan. 10, 2023", 15 pgs.
"U.S. Appl. No. 16/989,994, Final Office Action mailed Jan. 13, 2023", 8 pgs.
"U.S. Appl. No. 16/989,994, Response filed Feb. 27, 2023 to Final Office Action mailed Jan. 13, 2023", 8 pgs.
"U.S. Appl. No. 16/989,994, Notice of Allowance mailed Mar. 9, 2023", 6 pgs.
"U.S. Appl. No. 16/983,434, Response filed Mar. 9, 2023 to Final Office Action mailed Jan. 10, 2023", 11 pgs.
"Canadian Application Serial No. 2,945,255, Response filed Mar. 7, 2023 to Examiner's Rule 86(2) Report filed Nov. 14, 2022", 30 pgs.
"U.S. Appl. No. 16/983,434, Advisory Action mailed Mar. 21, 2023", 3 pgs.
"U.S. Appl. No. 16/983,434, Notice of Allowance mailed Apr. 20, 2023", 7 pgs.
"U.S. Appl. No. 16/989,994, Corrected Notice of Allowability mailed Jun. 16, 2023", 3 pgs.

* cited by examiner

HEAT DISSIPATION SYSTEMS WITH HYGROSCOPIC WORKING FLUID

CROSS-REFERENCE TO RELATED APPLICATIONS

This application is a continuation of U.S. Utility application Ser. No. 14/884,450, field Oct. 15, 2015, which is continuation-in-part of U.S. Utility application Ser. No. 13/953,332, filed Jul. 29, 2013, which is a continuation-in-part of U.S. Utility application Ser. No. 13/040,379, filed Mar. 4, 2011, which claims the benefit of priority to U.S. Provisional Application No. 61/345,864, filed May 18, 2010, the disclosures of which are incorporated herein in their entireties by reference.

STATEMENT REGARDING FEDERALLY SPONSORED RESEARCH OR DEVELOPMENT

This invention was made with government support under Cooperative Agreement No. DE-FC26-08NT43291 entitled "EERC-DOE Joint Program on Research and Development for Fossil Energy-Related Resources," awarded by the U.S. Department of Energy (DOE). The U.S. government has certain rights in the invention.

BACKGROUND OF THE INVENTION

Thermal energy dissipation is a universal task in industry that has largely relied on great quantities of cooling water to satisfy. Common heat rejection processes include steam condensation in thermoelectric power plants, refrigerant condensation in air-conditioning and refrigeration equipment, and process cooling during chemical manufacturing. In the case of power plants and refrigeration systems, it is desired to dissipate thermal energy at the lowest possible temperature with a minimal loss of water to the operating environment for optimum resource utilization.

Where the local environment has a suitable, readily available, low-temperature source of water, e.g., a river, sea, or lake, cooling water can be extracted directly. However, few of these opportunities for cooling are expected to be available in the future because competition for water sources and recognition of the impact of various uses of water sources on the environment are increasing. In the absence of a suitable, readily available coolant source, the only other common thermal sink available at all locations is ambient air. Both sensible heat transfer and latent heat transfer are currently used to reject heat to the air. In sensible cooling, air is used directly as the coolant for cooling one side of a process heat exchanger. For latent cooling, liquid water is used as an intermediate heat-transfer fluid. Thermal energy is transferred to the ambient air primarily in the form of evaporated water vapor, with minimal temperature rise of the air.

These technologies are used routinely in industry, but each one has distinct drawbacks. In the sensible cooling case, air is an inferior coolant compared to liquids, and the resulting efficiency of air-cooled processes can be poor. The air-side heat-transfer coefficient in air-cooled heat exchangers is invariably much lower than liquid-cooled heat exchangers or in condensation processes and, therefore, requires a large heat exchange surface area for good performance. In addition to larger surface area requirements, air-cooled heat exchangers approach the cooling limitation of the ambient dry-bulb temperature of the air used for cooling, which can vary 30° to 40° F. over the course of a day and can hinder cooling capacity during the hottest hours of the day. Air-cooled system design is typically a compromise between process efficiency and heat exchanger cost. Choosing the lowest initial cost option can have negative energy consumption implications for the life of the system.

In latent heat dissipation, the cooling efficiency is much higher, and the heat rejection temperature is more consistent throughout the course of a day since a wet cooling tower will approach the ambient dew point temperature of the air used for cooling instead of the oscillatory dry-bulb temperature of the air used for cooling. The key drawback or problem associated with this cooling approach is the associated water consumption used in cooling, which in many areas is a limiting resource. Obtaining sufficient water rights for wet cooling system operation delays plant permitting, limits site selection, and creates a highly visible vulnerability for opponents of new development.

Prior art U.S. Pat. No. 3,666,246 discloses a heat dissipation system using an aqueous desiccant solution circulated between the steam condenser (thermal load) and a direct-contact heat and mass exchanger in contact with an ambient air flow. In this system, the liquid solution is forced to approach the prevailing ambient dry-bulb temperature and moisture vapor pressure. To prevent excessive drying and precipitation of the hygroscopic desiccant from solution, a portion of the circulating hygroscopic desiccant flow is recycled back to an air contactor without absorbing heat from the thermal load. This results in a lower average temperature in the air contactor and helps to extend the operating range of the system.

The recirculation of unheated hygroscopic desiccant solution is effective for the ambient conditions of approximately 20° C. and approximately 50% relative humidity as illustrated by the example described in U.S. Pat. No. 3,666,246, but in drier, less humid environments, the amount of unheated recirculation hygroscopic desiccant flow must be increased to prevent crystallization of the hygroscopic desiccant solution. As the ambient air's moisture content decreases, the required recirculation flow grows to become a larger and larger proportion of the total flow such that no significant cooling of the condenser is taking place, thereby reducing the ability of the heat dissipation system to cool, in the extreme, to near zero or no significant cooling. Ultimately, once the hygroscopic desiccant is no longer a stable liquid under the prevalent environmental conditions, no amount of recirculation flow can prevent crystallization of the unheated hygroscopic desiccant solution.

Using the instantaneous ambient conditions as the approach condition for the hygroscopic desiccant solution limits operation of the heat dissipation system in U.S. Pat. No. 3,666,246 to a relative humidity of approximately 30% or greater with the preferred $MgCl_2$ hygroscopic desiccant solution. Otherwise, the hygroscopic desiccant may completely dry out and precipitate from solution. This limitation would exclude operation and use of the heat dissipation system described in U.S. Pat. No. 3,666,246 in regions of the world that experience significantly drier weather patterns, less humid air, and are arguably in need of improvements to dry cooling technology.

Additionally, while the heat dissipation system described in U.S. Pat. No. 3,666,246 discloses that the system may alternatively be operated to absorb atmospheric moisture and subsequently evaporate it, the disclosed heat dissipation system design circumvents most of this mode of operation of the heat dissipation system. Assuming that atmospheric moisture has been absorbed into hygroscopic desiccant solution during the cooler, overnight hours, evaporation of water from the hygroscopic desiccant will begin as soon as the ambient temperature begins to warm in the early morning, using the heat dissipation system described in U.S. Pat. No. 3,666,246, since it has no mechanism to curtail excessive moisture evaporation during the early morning transition period and no way to retain excess moisture for more beneficial use later in the daily cycle, such as afternoon, when ambient temperatures and cooling demand are typically higher. Instead, absorbed water in the hygroscopic desiccant in the heat dissipation system will begin evaporating as soon as the hygroscopic desiccant solution's vapor pressure of the heat dissipation system exceeds that of the ambient air, regardless of whether it is productively dissipating thermal energy from the heat load or wastefully absorbing the energy from the ambient air stream.

Improvements have been proposed to these basic cooling systems. Significant effort has gone into hybrid cooling concepts that augment air-cooled condensers with evaporative cooling during the hottest parts of the day. These systems can use less water compared to complete latent cooling, but any increased system performance is directly related to the amount of water-based augmentation, so these systems do not solve the underlying issue of water consumption. Despite the fact that meeting the cooling needs of industrial processes is a fundamental engineering task, significant improvements are still desired, primarily the elimination of water consumption while simultaneously maintaining high-efficiency cooling at reasonable cost.

There is a need for improved heat dissipation technology relative to current methods. Sensible cooling with air is costly because of the vast heat exchange surface area required and because its heat-transfer performance is handicapped during the hottest ambient temperatures. Latent or evaporative cooling has preferred cooling performance, but it consumes large quantities of water which is a limited resource in some locations.

Turbine inlet chilling (TIC) systems for combustion turbines are used to maintain the turbine's operating efficiency during extremes of hot weather and even to boost its performance above baseline under less severe ambient conditions. To do this, TIC systems employ vapor-compression chillers to cool the turbine's incoming ambient air in order to approach conditions where the turbine is designed to produce its full-load rating. These chillers have a significant heat rejection load to the environment that is typically dissipated by wet evaporative cooling. While condensed water collection can be 40% of the evaporative makeup water requirement for a conventional wet cooling tower, this is insufficient to make the system water-neutral.

SUMMARY OF THE INVENTION

A heat dissipation system apparatus and method of operation using hygroscopic working fluid for use in a wide variety of environments for absorbed water in the hygroscopic working fluid to be released to minimize water consumption in the heat dissipation system apparatus for effective cooling in environments having little available water for use in cooling systems.

In various embodiments, the present invention provides a method for heat dissipation using a hygroscopic working fluid. The method includes transferring thermal energy from a heated process fluid to the hygroscopic working fluid in a process heat exchanger, to form a cooled process fluid. The method includes condensing liquid from a feed gas on a heat transfer surface of a feed gas heat exchanger in contact with the cooled process fluid, to form a cooled feed gas, the heated process fluid, and a condensate. The method includes dissipating thermal energy from the hygroscopic working fluid to a cooling gas composition with a fluid-air contactor. The method includes transferring moisture between the hygroscopic working fluid and the cooling gas composition with the fluid-air contactor. The method includes adding at least part of the condensate to the hygroscopic working fluid.

In various embodiments, the present invention provides a method for heat dissipation using a hygroscopic working fluid. The method includes transferring thermal energy from a heated process fluid to the hygroscopic working fluid in a process heat exchanger, to form a cooled process fluid. The method includes transferring thermal energy from the feed gas to the cooled process fluid in a feed gas heat exchanger, to form a cooled feed gas and the heated process fluid. The method includes feeding the cooled feed gas to a combustion turbine. The method includes transferring thermal energy from the hygroscopic working fluid to a cooling gas composition with a fluid-air contactor. The method includes transferring moisture between the hygroscopic working fluid and the cooling gas composition with the fluid-air contactor.

In various embodiments, the present invention provides a method for heat dissipation using a hygroscopic working fluid. The method includes transferring thermal energy from a heated process fluid to the hygroscopic working fluid in a chiller, to form a cooled process fluid. The method includes condensing liquid from a feed gas on a heat transfer surface of a feed gas heat exchanger in contact with the cooled process fluid, to form a cooled feed gas, the heated process fluid, and a condensate. The chiller includes a compressor that compresses a chiller working fluid prior to transferring thermal energy from the compressed chiller working fluid to the hygroscopic working fluid. The chiller includes a valve that allows the chiller working fluid to expand prior to transferring thermal energy from the heated process fluid to the expanded chiller working fluid. The method includes feeding the cooled feed gas to a combustion turbine. The method includes dissipating thermal energy from the hygroscopic working fluid to a cooling gas composition with a fluid-air contactor, the cooling gas composition including the ambient atmosphere. The method includes transferring moisture between the hygroscopic working fluid and the cooling gas composition with the fluid-air contactor. The method includes adding at least part of the condensate to the hygroscopic working fluid. The condensing of the liquid from the feed gas provides sufficient condensate to make up for water lost from the hygroscopic working fluid to the cooling gas composition in the fluid-air contactor, providing at least water-neutral operation.

In various embodiments, the present invention provides a system for heat dissipation using a hygroscopic working fluid. The system includes a process heat exchanger configured to transfer thermal energy from a heated process fluid to a hygroscopic working fluid to form a cooled process fluid. The system includes a feed gas heat exchanger configured to condense liquid from a feed gas on a heat transfer surface of the feed gas heat exchanger in contact with the cooled process fluid, to form a cooled feed gas, the heated process fluid, and a condensate. The system includes a fluid-air contactor configured to dissipate heat from the hygroscopic working fluid to a cooling gas composition, and configured to transfer moisture between the hygroscopic working fluid and the cooling gas composition. The system is configured to add at least part of the condensate to the hygroscopic working fluid.

The condenser cooling load of a TIC chiller is on the order of 20% of the heat rejection load for an entire natural gas combined cycle power plant, and since TIC systems are frequently added after initial construction, the plant's existing cooling system typically does not have the extra capacity to accommodate the TIC system. Dry cooling of TIC systems is desirable because it would eliminate the need to source additional cooling water for the plant. However, the large chillers employed for TIC are predominantly designed for liquid cooling instead of using an air-cooled condenser, which results in an inefficient dry cooling configuration including a sensible, air-cooled water loop with two heat transfer interfaces.

In various embodiments, the present invention provides certain advantages over other methods of cooling a feed gas, at least some of which are unexpected. For example, performing cooling via use of desiccant-based hygroscopic fluid to meet the heat rejection needs of a TIC system can enable efficient and water-neutral TIC operation.

In various embodiments, the preferred climates and/or times day that are most competitive for TIC enable the use of a less corrosive desiccant, e.g., $CaCl_2$), that can be used to directly cool the chiller's refrigerant condenser without the need for an intermediate heat exchanger. Many of the large chillers offer titanium metallurgy which is recommended for $CaCl_2$) solutions and eliminating the intermediate heat transfer step can improve the efficiency of condenser cooling. Preferred climates for TIC include high humidity areas where it is has a competitive advantage over evaporative turbine inlet cooling. With thermal storage, TIC condenser cooling demand is transferred to off-peak hours which are inherently cooler. Both of these conditions favor the use of desiccants like $CaCl_2$) which are less corrosive, but also less able to withstand extremely hot and dry conditions.

In various embodiments, condensate from cooling the feed gas (e.g., turbine inlet air) can be consumed and used to augment the performance of the desiccant cooling system. This condensate is generally free of scaling components that could precipitate and foul the desiccant cooling system and is an excellent source of water to mix with the desiccant to augment cooling performance without concerns of introducing a mineral imbalance. Excess water added to the desiccant increases the amount of latent heat transfer that can take place in the air-desiccant contactor, thereby enabling either lower cold desiccant temperatures or a higher cooling capacity. The amount of water recovered as condensate could exceed 40% of the evaporative makeup water needed by a conventional wet cooling system to cool the TIC system, which would make a sizeable contribution to the performance of a desiccant-based hygroscopic fluid cooling system, but is far short of the water needed to reach water-neutral operation with conventional wet cooling. In contrast, in various embodiments of the method and system for cooling a feed gas using a hygroscopic working fluid, the condensate collected can be equal to or greater than the amount of water lost from the hygroscopic working fluid, providing water-neutral operation.

Operating characteristics of the TIC system generally negate the criticality of using wet cooling. As previously mentioned the preferred climates and times of operation for TIC coincide with more humid and cooler conditions. These conditions reduce the differential in cooling performance that can be achieved with conventional wet cooling versus a dry system. These characteristics combined with the augmentation possible by using condensed water from inlet air chilling suggest that in various embodiments desiccant-based hygroscopic fluid cooling can be applied to a TIC system, making the process water neutral, with minimal impact to performance or with better performance compared to conventional wet or dry cooling arrangements.

DETAILED DESCRIPTION OF THE INVENTION

Figure 1:
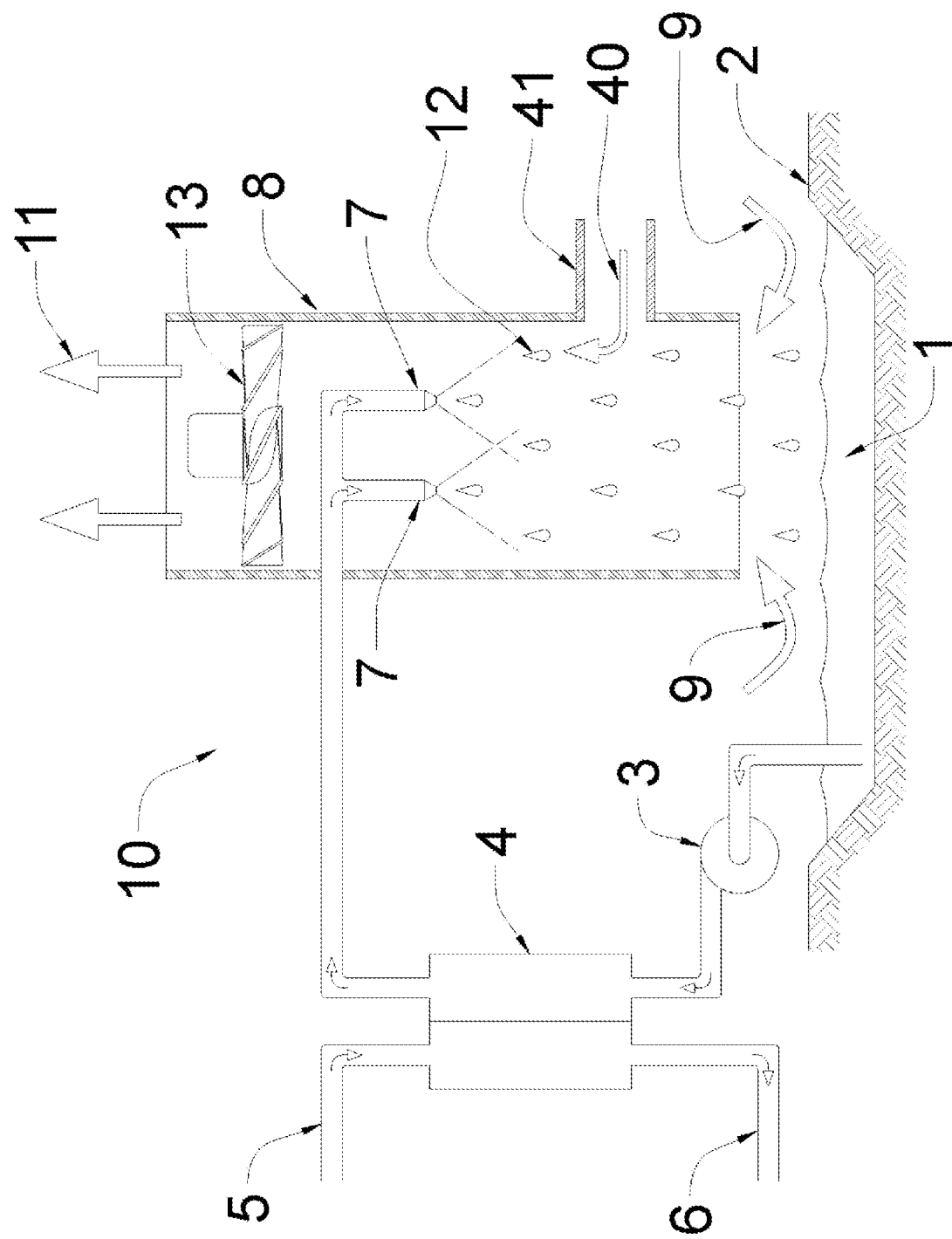
FIG. 1 is a schematic of the heat dissipation system, according to various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001." All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The heat dissipation systems described herein are an improvement to the state of the art in desiccant-based (hygroscopic) fluid cooling systems by incorporating means to regulate the amount of sensible heat transfer, e.g., heat exchanged having as its sole effect a change of temperature versus latent heat transfer, e.g., heat exchanged without change of temperature, taking place in heat dissipation system so that the desiccant-based hygroscopic fluid remains stable (hygroscopic desiccant in solution) to prevent crystallization of the desiccant from the desiccant-based hygroscopic fluid. In simple form, the heat dissipation system includes at least one hygroscopic desiccant-to-air direct-contact heat exchanger for heat exchange having combined sensible and latent heat transfer, at least one sensible heat exchanger for heat exchange with a change of temperature of the heat exchange fluid used, and at least one desiccant (hygroscopic) fluid for use as the heat exchange fluid in the heat dissipation system to exchange water with the atmosphere to maintain the water content of the desiccant (hygroscopic) fluid. In the heat dissipation systems described herein, thermal energy is dissipated at a higher (but still allowable) temperature during cooler ambient periods in order to maintain cooling capacity during peak ambient temperatures. In some embodiments, preventing crystallization of the desiccant includes preventing substantially all crystallization of the desiccant. In some embodiments, preventing crystallization of the desiccant can include substantially preventing crystallization of the desiccant but allowing less than a particular small amount of crystallization to occur, for example, wherein no more than about 0.000,000, 001 wt % or less of the desiccant present in solution crystallizes, or such as no more than about 0.000,000,01, 0.000,000,1, 0.000,001, 0.000,01, 0.000,1, 0.001, 0.01, 0.1, 1, 1, 1.5, 2, 3, 4, 5 wt %, or no more than about 10 wt % of the desiccant present in solution crystallizes.

In various embodiments, the heat dissipation systems described herein can include staged sequences of the direct-contact air-fluid latent heat exchangers and sensible heat exchangers that interface with the thermal load, wherein the heat exchangers can have any flow arrangement, such as counterflowing, cross flowing, or any other suitable arrangement. Feedback from one stage of the direct-contact air-fluid latent heat exchanger is passed to another stage of the direct-contact air-fluid latent heat exchanger in the form of increased vapor pressure in the air stream and reduced temperature of the hygroscopic desiccant working fluid servicing the thermal load. Combined, such staged sequences of the direct-contact air-fluid latent exchangers and the sensible heat exchangers that interface with the thermal load reduce the proportion of the thermal load passed to the initial, cooler stages of the direct-contact air-fluid latent heat exchangers (which contain much of the moisture absorbed during cooler periods) and prevent excessive evaporation from the final, hotter stages of the direct-contact air-fluid latent heat exchangers.

The heat dissipation systems described herein each circulate at least one (or multiple differing types of) hygroscopic working fluid to transfer heat from a process requiring cooling directly to the ambient air. The hygroscopic fluid is in liquid phase at conditions in which it is at thermal and vapor pressure equilibrium with the expected local ambient conditions so that the desiccant-based hygroscopic fluid remains stable to prevent crystallization of the desiccant from the desiccant-based hygroscopic fluid. The hygroscopic fluid includes a solution of a hygroscopic substance and water. In one embodiment, the hygroscopic substance itself should have a very low vapor pressure compared to water in order to prevent significant loss of the hygroscopic component of the fluid during cycle operation. The hygroscopic component can be a pure substance or a mixture of substances selected from compounds known to attract moisture vapor and form liquid solutions with water that have reduced water vapor pressures. The hygroscopic component includes all materials currently employed for desiccation operations or dehumidifying operations, including hygroscopic inorganic salts, such as LiCl, LiBr, $CaCl_2$), $ZnCl_2$; hygroscopic organic compounds, such as ethylene glycol, propylene glycol, triethylene glycol; or inorganic acids, such as $H_2SO_4$ and the like.

Thermal energy is removed from the process in a suitable sensible heat exchanger having on one side thereof, the flow of process fluid, and on the other side thereof, the flow of hygroscopic working fluid coolant. This sensible heat exchanger can take the form of any well-known heat exchange device, including shell-and-tube heat exchangers, plate-and-frame heat exchangers, or falling-film heat exchangers. The process fluid being cooled includes a single-phase fluid, liquid, or gas or can be a fluid undergoing phase change, e.g., condensation of a vapor into a liquid. Consequently, the thermal load presented by the hygroscopic process fluid can be sensible, e.g., with a temperature change, or latent which is isothermal. Flowing through the other side of the sensible heat exchange device, the hygroscopic working fluid coolant can remove heat sensibly, such as in a sealed device with no vapor space, or it can provide a combination of sensible and latent heat removal if partial evaporation of the moisture in solution is allowed, such as in the film side of a falling-film type heat exchanger.

After thermal energy has been transferred from the process fluid to the hygroscopic working fluid using the sensible heat exchanger, the hygroscopic fluid is circulated to an air-contacting latent heat exchanger where it is exposed directly to ambient air for heat dissipation. The latent heat exchanger is constructed in such a way as to generate a large amount of interfacial surface area between the desiccant solution and air. Any well-known method may be used to generate the interfacial area, such as by including a direct spray of the liquid into the air, a flow of hygroscopic solution distributed over random packings, or a falling film of hygroscopic liquid solution down a structured surface. Flow of the air and hygroscopic desiccant solution streams can be conducted in the most advantageous way for a particular situation, such as countercurrent where the hygroscopic desiccant solution may be flowing down by gravity and the air is flowing up, crossflow where the flow of hygroscopic desiccant solution is in an orthogonal direction to airflow, cocurrent where the hygroscopic desiccant solution and air travel in the same direction, or any intermediary flow type.

Heat- and mass-transfer processes inside the latent heat exchanger are enhanced by convective movement of air through the latent heat exchanger. Convective flow may be achieved by several different means or a combination of such different means. The first means for convective airflow is through natural convection mechanisms such as by the buoyancy difference between warmed air inside the latent heat exchanger and the cooler and the surrounding ambient air. This effect would naturally circulate convective airflow through a suitably designed chamber in which the air is being heated by the warmed solution in the latent heat exchanger. Another means for convective airflow includes the forced flow of air generated by a fan or blower for flowing air through the latent heat exchanger. A further convective airflow means includes inducing airflow using momentum transfer from a jet of solution pumped out at sufficient mass flow rate and velocity into the latent heat exchanger.

Inside the latent heat exchanger, an interrelated process of heat and mass transfer occurs between the hygroscopic solution used as the working fluid and the airflow that ultimately results in the transfer of thermal energy from the solution to the air. When the air and hygroscopic solution are in contact, they will exchange moisture mass and thermal energy in order to approach equilibrium, which for a hygroscopic liquid and its surrounding atmosphere requires a match of temperature and water vapor pressure. Since the hygroscopic solution's vapor pressure is partially dependent on temperature, the condition is often reached where the hygroscopic solution has rapidly reached its equivalent dew point temperature by primarily latent heat transfer (to match the ambient vapor pressure), and then further evaporation or condensation is limited by the slower process of heat transfer between the air and the hygroscopic solution (to match the ambient temperature).

The net amount of heat and mass transfer within the latent heat exchanger is dependent on the specific design of the latent heat exchanger and the inlet conditions of the hygroscopic solution and the ambient air. However, the possible outcomes as hygroscopic solution passes through the latent heat exchanger include situations where the hygroscopic solution can experience a net loss of moisture (a portion of the thermal energy contained in the solution is released as latent heat during moisture evaporation; this increases the humidity content of the airflow), the hygroscopic solution can experience a net gain in moisture content (such occurs when the vapor pressure in the air is higher than in the solution, and moisture is absorbed by the hygroscopic solution having the latent heat of absorption released into the hygroscopic solution and being transferred sensibly to the air), and the hygroscopic solution is in a steady state where no net moisture change occurs (any evaporation being counterbalanced by an equivalent amount of reabsorption, or vice versa).

After passing through the latent heat exchanger, the hygroscopic solution has released thermal energy to the ambient air either through sensible heat transfer alone or by a combination of sensible heat transfer and latent heat transfer (along with any concomitant moisture content change). The hygroscopic solution is then collected in a reservoir, the size of which will be selected to offer the best dynamic performance of the overall cooling system for a given environmental location and thermal load profile. It can be appreciated that the reservoir can alter the time constant of the cooling system in response to dynamic changes in environmental conditions. For example, moisture absorption in the ambient atmosphere will be most encouraged during the night and early morning hours, typically when diurnal temperatures are at a minimum, and an excess of moisture may be collected. On the other extreme, moisture evaporation in the ambient atmosphere will be most prevalent during the afternoon when diurnal temperatures have peaked, and there could be a net loss of hygroscopic solution moisture content. Therefore, for a continuously operating system in the ambient atmosphere, the reservoir and its method of operation can be selected so as to optimize the storage of excess moisture gained during the night so that it can be evaporated during the next afternoon, to maintain cooling capacity and ensure that the desiccant-based hygroscopic fluid remains stable to prevent crystallization of the hygroscopic desiccant from the desiccant-based hygroscopic fluid.

The reservoir itself can be a single mixed tank where the average properties of the solution are maintained. The reservoir also includes a stratified tank or a series of separate tanks intended to preserve the distribution of water collection throughout a diurnal cycle so that collected water can be metered out to provide maximum benefit.

The present heat dissipation system includes the use of a hygroscopic working fluid to remove thermal energy from a process stream and dissipate it to the atmosphere by direct contact of the working fluid and ambient air. This enables several features that are highly beneficial for heat dissipation systems, including 1) using the working fluid to couple the concentrated heat-transfer flux in the process heat exchanger to the lower-density heat-transfer flux of ambient air heat dissipation, 2) allowing for large interfacial surface areas between the working fluid and ambient air, 3) enhancing working fluid-air heat-transfer rates with simultaneous mass transfer, and 4) moderating daily temperature fluctuations by cyclically absorbing and releasing moisture vapor from and to the air.

Referring to drawing FIG. 1, one embodiment of a heat dissipation system 10 is illustrated using a hygroscopic working fluid 1 in storage reservoir 2 drawn by pump 3 and circulated through process sensible heat exchanger 4. In the process heat exchanger, the hygroscopic working fluid removes thermal energy from the process fluid that enters hot-side inlet 5 and exits through hot-side outlet 6. The process fluid can be a single phase (gas or liquid) that requires sensible cooling or it could be a two-phase fluid that undergoes a phase change in the process heat exchanger, e.g., condensation of a vapor into a liquid.

After absorbing thermal energy in process heat exchanger 4, the hygroscopic working fluid is routed to distribution nozzles 7 where it is exposed in a countercurrent fashion to air flowing through air contactor latent heat exchanger 8. Ambient airflow through the air contactor in drawing FIG. 1 is from bottom ambient air inlet 9 vertically to top air outlet 11 and is assisted by the buoyancy of the heated air and by powered fan 13. Distributed hygroscopic working fluid 12 in the air contactor flows down, countercurrent to the airflow by the pull of gravity. At the bottom of air contactor latent heat exchanger 8, the hygroscopic working fluid is separated from the inlet airflow and is returned to stored solution 1 in reservoir 2.

In air contactor latent heat exchanger 8, both thermal energy and moisture are exchanged between the hygroscopic working fluid and the airflow, but because of the moisture retention characteristics of the hygroscopic solution working fluid, complete evaporation of the hygroscopic working fluid is prevented and the desiccant-based hygroscopic working fluid remains stable (hygroscopic desiccant in solution) to prevent crystallization of the desiccant from the desiccant-based hygroscopic fluid.

If the heat dissipation system 10 is operated continuously with unchanging ambient air temperature, ambient humidity, and a constant thermal load in process sensible heat exchanger 4, a steady-state temperature and concentration profile will be achieved in air contactor latent heat exchanger 8. Under these conditions, the net moisture content of stored hygroscopic working fluid 1 will remain unchanged. That is not to say that no moisture is exchanged between distributed hygroscopic working fluid 12 and the airflow in air contactor latent heat exchanger 8, but it is an indication that any moisture evaporated from hygroscopic working fluid 12 is reabsorbed from the ambient airflow before the hygroscopic solution is returned to reservoir 2.

However, prior to reaching the aforementioned steady-state condition and during times of changing ambient conditions, heat dissipation system 10 may operate with a net loss or gain of moisture content in hygroscopic working fluid 1. When operating with a net loss of hygroscopic working fluid moisture, the equivalent component of latent thermal energy contributes to the overall cooling capacity of the heat dissipation system 10. In this case, the additional cooling capacity is embodied by the increased moisture vapor content of airflow 11 exiting air contactor latent heat exchanger 8.

Conversely, when operating with a net gain of hygroscopic working fluid moisture (water) content, the equivalent component of latent thermal energy must be absorbed by the hygroscopic working fluid and dissipated to the airflow by sensible heat transfer. In this case, the overall cooling capacity of the heat dissipation system 10 is diminished by the additional latent thermal energy released to the hygroscopic working fluid. Airflow 11 exiting air contactor latent heat exchanger 8 will now have a reduced moisture content compared to inlet ambient air 9.

As an alternative embodiment of heat dissipation system 10 illustrated in drawing FIG. 1, the heat dissipation system 10 uses the supplementation of the relative humidity of inlet ambient air 9 with supplemental gas stream 40 entering through supplemental gas stream inlet 41. When used, gas stream 40 can be any gas flow containing sufficient moisture vapor including ambient air into which water has been evaporated either by misting or spraying, an exhaust stream from a drying process, an exhaust stream of high-humidity air displaced during ventilation of conditioned indoor spaces, an exhaust stream from a wet evaporative cooling tower, or a flue gas stream from a combustion source and the associated flue gas treatment systems. The benefit of using supplemental gas stream 40 is to enhance the humidity level in air contactor latent heat exchanger 8 and encourage absorption of moisture into dispersed hygroscopic working fluid 12 in climates having low ambient humidity. It is also understood that supplemental gas stream 40 would only be active when moisture absorption is needed to provide a net benefit to cyclic cooling capacity, e.g., where the absorbed moisture would be evaporated during a subsequent time of peak cooling demand or when supplemental humidity is needed to prevent excessive moisture (water) loss from the hygroscopic working fluid so that the desiccant-based hygroscopic fluid remains stable (hygroscopic desiccant in solution) to prevent crystallization of the desiccant from the desiccant-based hygroscopic fluid.

Figure 2A:
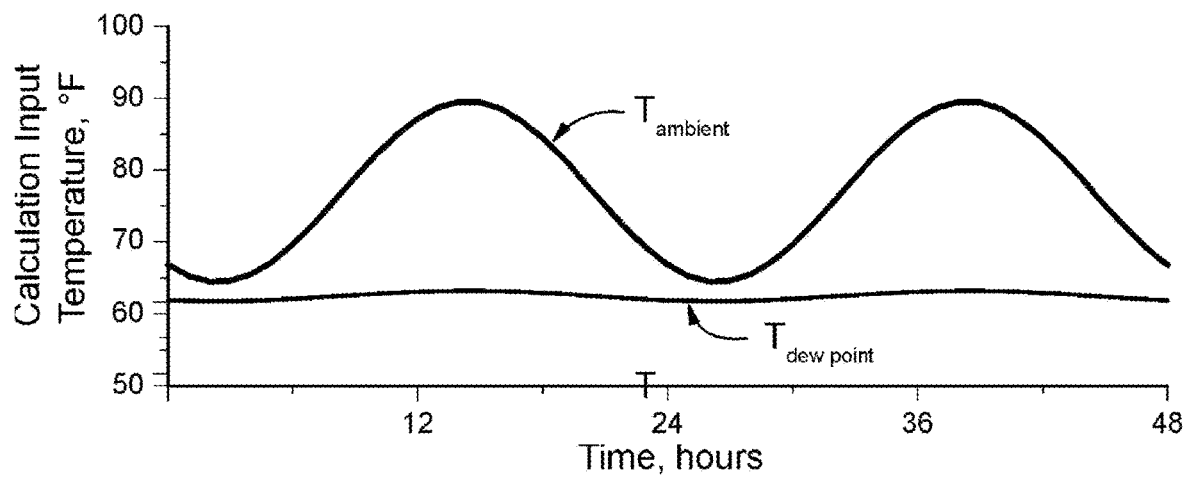
FIG. 2A is a chart depicting the input temperature conditions used to calculate the dynamic response, according to various embodiments.

With the operation of the heat dissipation system 10 described herein and the effects of net moisture change set forth, the performance characteristics of cyclic operation can be appreciated. Illustrated in drawing FIG. 2A is a plot of the cyclic input conditions of ambient air dry-bulb temperature and dew point temperature. The cycle has a period of 24 hours and is intended to be an idealized representation of a diurnal temperature variation. The moisture content of the air is constant for the input data of drawing FIG. 2A since air moisture content does not typically vary dramatically on a diurnal cycle.

Figure 2B:
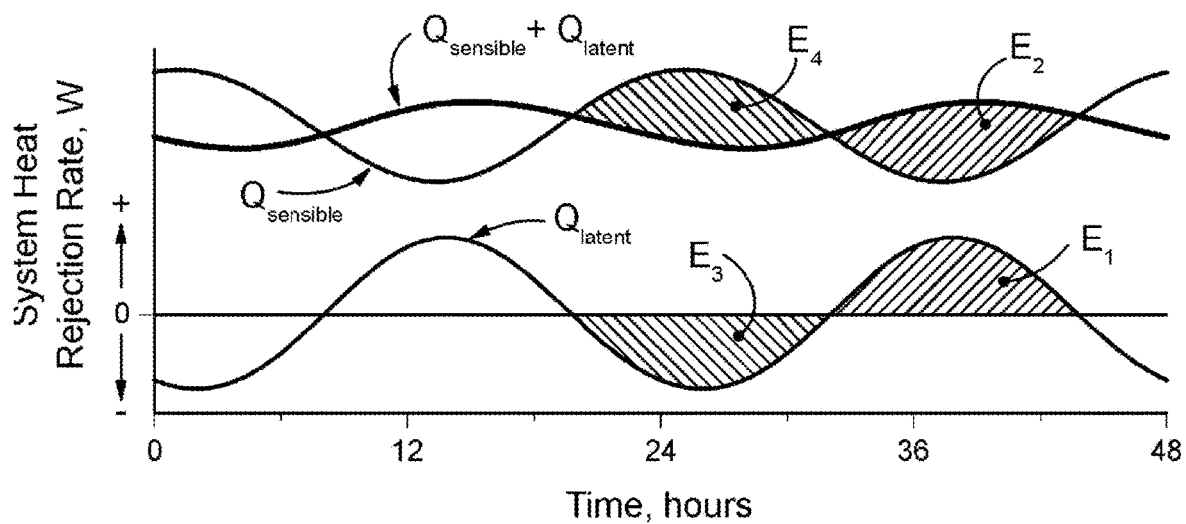
FIG. 2B is a chart depicting the calculated components of heat transfer of the present invention in response to the cyclical input temperature profile of FIG. 2A, according to various embodiments.

Illustrated in drawing FIG. 2B is the calculated heat-transfer response of the present invention corresponding to the input data of drawing FIG. 2A. The two components of heat transfer are sensible heat transfer and latent heat transfer, and their sum represents the total cooling capacity of the system. As shown in drawing FIG. 2B, the sensible component of heat transfer ($Q_{sensible}$) varies out of phase with the ambient temperature since sensible heat transfer is directly proportional to the hygroscopic working fluid and the airflow temperature difference (all other conditions remaining equal). In practice, a conventional air-cooled heat exchanger is limited by this fact. In the case of a power plant steam condenser, this is the least desirable heat-transfer limitation since cooling capacity is at a minimum during the hottest part of the day, which frequently corresponds to periods of maximum demand for power generation.

The latent component of heat transfer illustrated in drawing FIG. 2B ($Q_{latent}$) is dependent on the ambient moisture content and the moisture content and temperature of the hygroscopic working fluid. According to the sign convention used in drawing FIG. 2B, when the latent heat-transfer component is positive, evaporation is occurring with a net loss of moisture, and the latent thermal energy is dissipated to the ambient air; when the latent component is negative, the hygroscopic solution is absorbing moisture, and the latent energy is being added to the working fluid, thereby diminishing overall cooling capacity. During the idealized diurnal cycle illustrated in drawing FIG. 2A, the latent heat-transfer component illustrated in drawing FIG. 2B indicates that moisture absorption and desorption occur alternately as the ambient temperature reaches the cycle minimum and maximum, respectively. However, over one complete cycle, the net water transfer with the ambient air is zero, e.g., the moisture absorbed during the night equals the moisture evaporated during the next day, so there is no net water consumption.

The net cooling capacity of the heat dissipation system 10 is illustrated in drawing FIG. 2B as the sum of the sensible and latent components of heat transfer ($Q_{sensible}+Q_{latent}$). As illustrated, the latent component of heat transfer acts as thermal damping for the entire system by supplementing daytime cooling capacity with evaporative cooling, region $E_1$ illustrated in drawing FIG. 2B. This evaporative heat transfer enhances overall heat transfer by compensating for declining sensible heat transfer during the diurnal temperature maximum, region $E_2$. This is especially beneficial for cases like a power plant steam condenser where peak conversion efficiency is needed during the hottest parts of the day.

The cost of this boost to daytime heat transfer comes at night when the absorbed latent energy, region $E_3$, is released into the working fluid and must be dissipated to the airflow. During this time, the total system cooling capacity of heat dissipation system 10 is reduced by an equal amount from its potential value, region $E_4$. However, this can be accommodated in practice since the nighttime ambient temperature is low and overall heat transfer is still acceptable. For a steam power plant, the demand for peak power production is also typically at a minimum at night.

Regarding air contactor heat exchanger configuration, direct contact of the hygroscopic working fluid and surrounding air allows the creation of significant surface area with fewer material and resource inputs than are typically required for vacuum-sealed air-cooled condensers or radiators. The solution-air interfacial area can be generated by any means commonly employed in industry, e.g., spray contactor heat exchanger, wetted packed bed heat exchanger (with regular or random packings), or a falling-film contactor heat exchanger.

Air contactor heat exchanger 8, illustrated in drawing FIG. 1, is illustrated as a counterflow spray contactor heat exchanger. While the spray arrangement is an effective way to produce significant interfacial surface area, in practice such designs can have undesirable entrained aerosols carried out of the spray contactor heat exchanger by the airflow. An alternate embodiment of the air contactor heat exchanger to prevent entrainment is illustrated in drawing FIG. 3, which is a crossflow, falling-film contactor heat exchanger designed to minimize droplet formation and liquid entrainment. Particulate sampling across such an experimental device has demonstrated that there is greatly reduced propensity for aerosol formation with this design.

Figure 3:
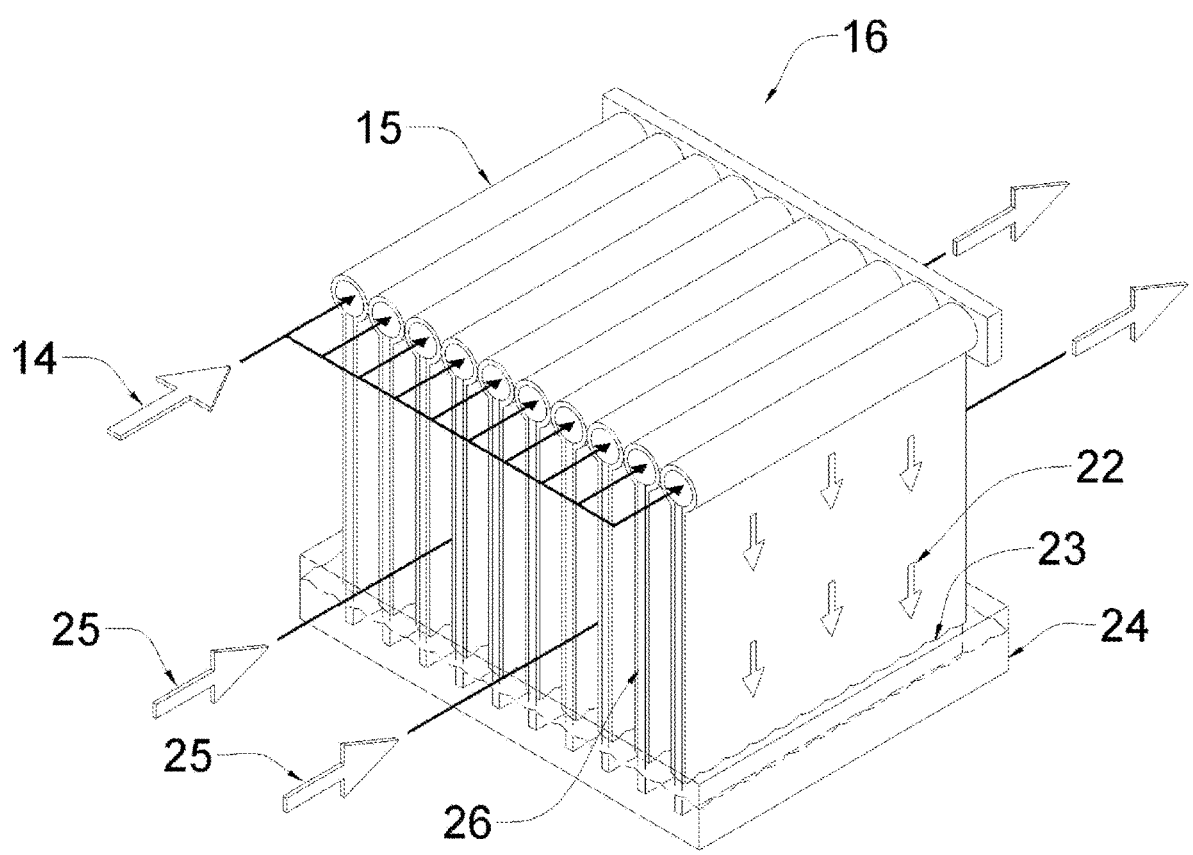
FIG. 3 is a schematic of a cross-flow air contactor, according to various embodiments.
Figure 4:
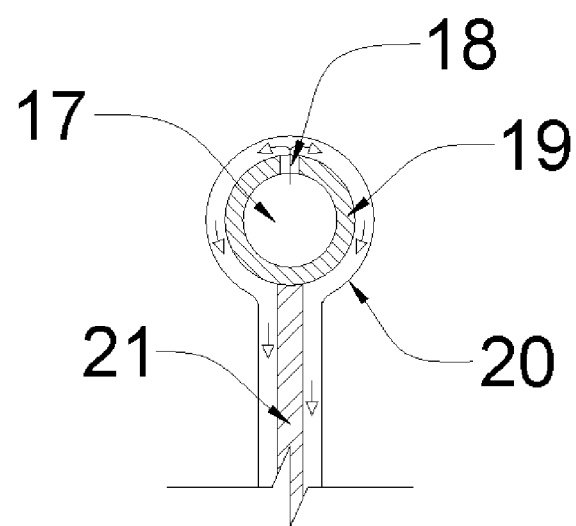
FIG. 4 is a cross-sectional detail of one of the tube headers shown in the air contactor of FIG. 3, according to various embodiments.

Illustrated in drawing FIG. 3, inlet hygroscopic working fluid 14 is pumped into distribution headers at the top of falling-film contactor heat exchanger 16. Referring to drawing FIG. 4, which is a cross section of an individual distribution header, hygroscopic working fluid 17 is pumped through distribution holes 18 located approximately perpendicular (at 90°) to the axis of tube header 19 where it wets falling-film wick 20 constructed from a suitable material such as woven fabric, plastic matting, or metal screen. Film wick support 21 is used to maintain the shape of each wick section. Illustrated in drawing FIG. 3, distributed film 22 of the hygroscopic working fluid solution flows down by gravity all of the way to the surface of working fluid 23 in reservoir 24. Inlet airflow 25 flows horizontally through the air contactor between falling-film sheets 26. In the configuration illustrated in drawing FIG. 3, heat and mass transfer take place between distributed film 22 of hygroscopic working fluid and airflow 25 between falling-film sections 26. While drawing FIG. 3 illustrates a crossflow configuration, it is understood that countercurrent, cocurrent, or mixed flow is also possible with this configuration provided that the desiccant-based hygroscopic fluid remains stable (hygroscopic desiccant in solution) to prevent crystallization of the desiccant from the desiccant-based hygroscopic fluid.

Figure 5A:
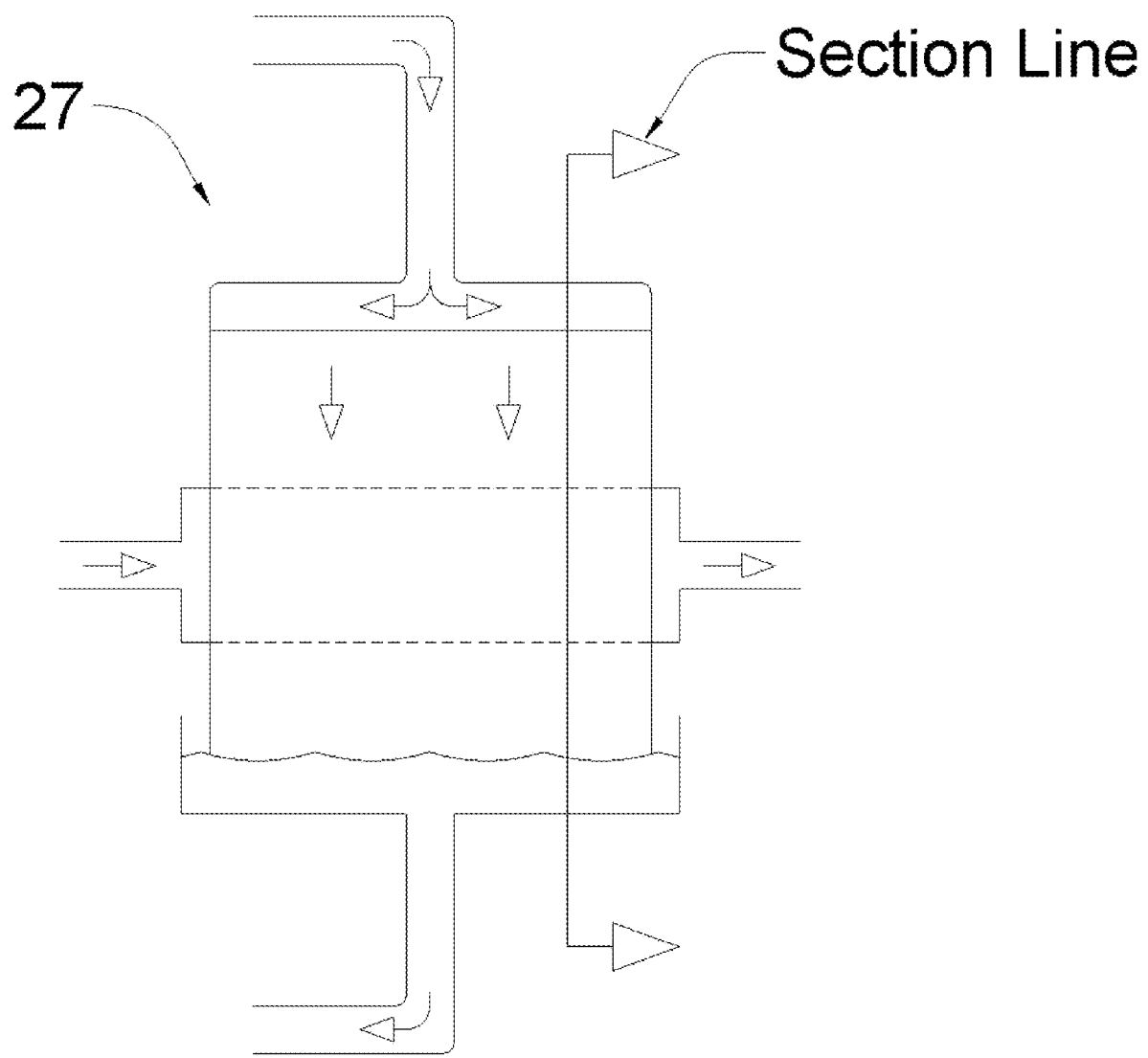
FIG. 5A is a schematic of a falling-film process heat exchanger, according to various embodiments.
Figure 5B:
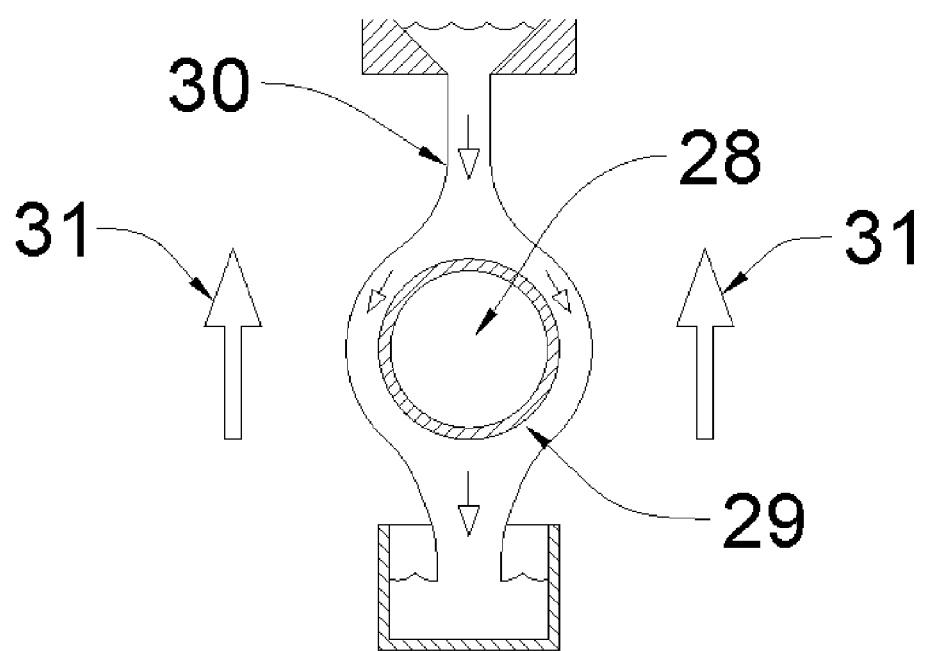
FIG. 5B is a section view of the process heat exchanger in FIG. 5A as viewed from the indicated section line, according to various embodiments.

Illustrated in drawing FIG. 1, the process heat sensible exchanger 4 can assume the form of any indirect sensible heat exchanger known in the art such as a shell-and-tube or plate-type exchanger. One specific embodiment of the sensible heat exchanger that is advantageous for this service is the falling-film type heat exchanger. Illustrated in drawing FIG. 5A is a schematic of alternate embodiment process heat exchanger 27. Illustrated in drawing FIG. 5B is a cross-sectional view of process heat exchanger 27 viewed along the indicated section line in drawing FIG. 5A. Referring to drawing FIG. 5B, process fluid 28 (which is being cooled) is flowing within tube 29. Along the top of tube 29, cool hygroscopic working fluid 30 is distributed to form a film surface which flows down by gravity over the outside of tube 29. Flowing past the falling-film assembly is airflow 31 which is generated either by natural convection or by forced airflow from a fan or blower.

As hygroscopic working fluid 30 flows over the surface of tube 29, heat is transferred from process fluid 28 through the tube wall and into the hygroscopic working fluid film by conduction. As the film is heated, its moisture vapor pressure rises and may rise to the point that evaporation takes place to surrounding airflow 31, thereby dissipating thermal energy to the airflow. Falling-film heat transfer is well known in the art as an efficient means to achieve high heat-transfer rates with low differential temperatures. One preferred application for the falling-film heat exchanger is when process fluid 28 is undergoing a phase change from vapor to liquid, as in a steam condenser, where temperatures are isothermal and heat flux can be high.

Figure 6:
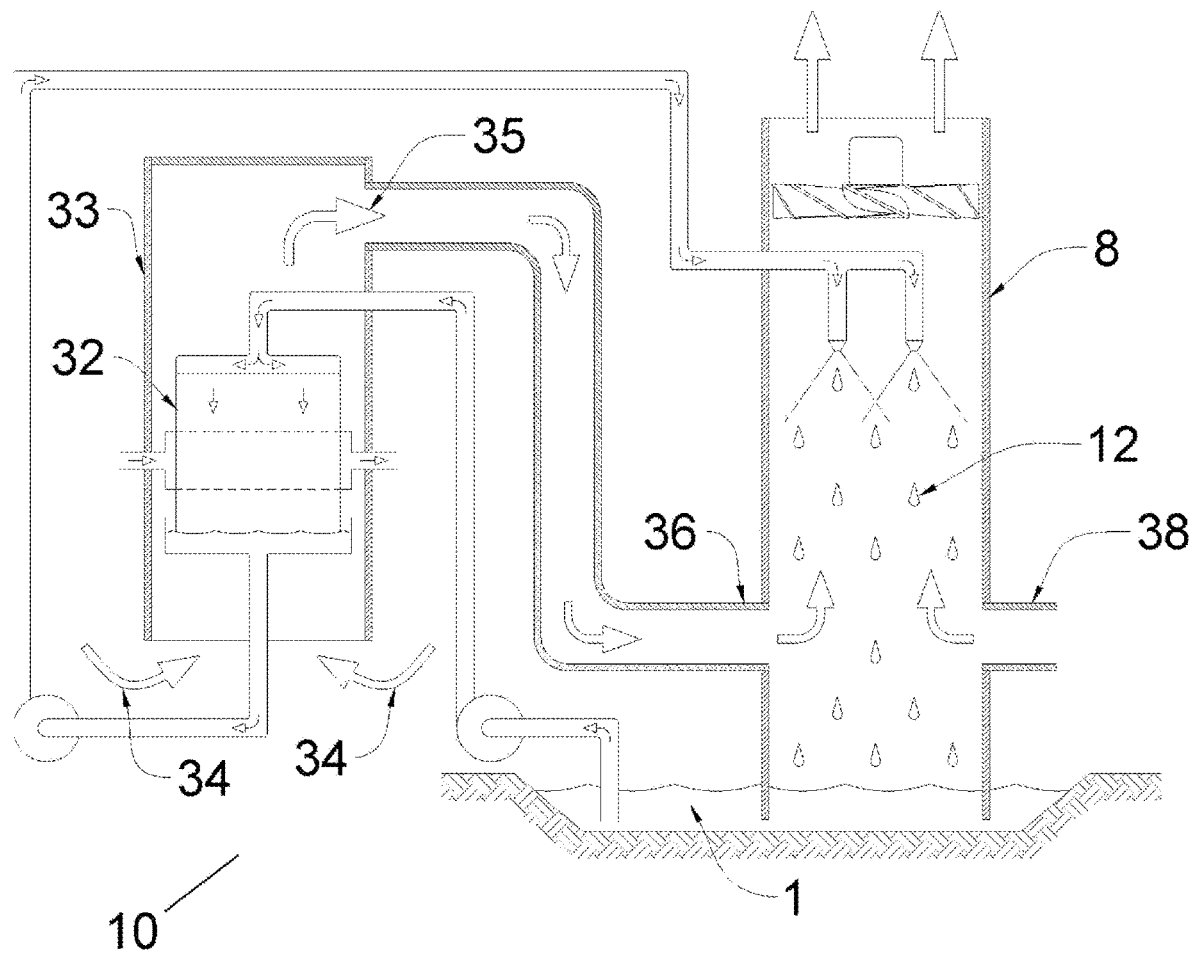
FIG. 6 is a schematic of an embodiment incorporating a falling-film process heat exchanger to precondition the air contactor inlet air, according to various embodiments.

A further embodiment of the heat dissipation system 10 is illustrated in drawing FIG. 6. The heat dissipation system 10 incorporates the film-cooled process sensible heat exchanger to condition a portion of the airflow entering air contactor latent heat exchanger 8. Illustrated in drawing FIG. 6, process sensible heat exchanger 32 is cooled by a falling film of hygroscopic working fluid inside housing 33. Ambient air 34 is drawn into process sensible heat exchanger housing 33 and flows past the film-cooled heat exchanger where it receives some quantity of evaporated moisture from the hygroscopic fluid film. The higher-humidity airflow at 35 is conducted to inlet 36 of air contactor latent heat exchanger 8 where the airflow 35 is flowing countercurrent to the spray of hygroscopic working fluid 12. Additional ambient air may also be introduced to the inlet of air contactor latent heat exchanger 8 through alternate opening 38.

In the embodiment illustrated in drawing FIG. 6, moisture vapor released from process sensible heat exchanger 32 is added to the air contactor's inlet airstream and thereby increases the moisture content by a finite amount above ambient humidity levels. This effect will tend to inhibit moisture evaporation from hygroscopic working fluid 12 and will result in a finite increase to the steady-state moisture content of reservoir hygroscopic solution 1 so that the desiccant-based hygroscopic fluid remains stable (hygroscopic desiccant in solution) to prevent crystallization of the desiccant from the desiccant-based hygroscopic fluid. The embodiment illustrated in drawing FIG. 6 may be preferred in arid environments and during dry weather in order to counteract excessive evaporation of moisture from the hygroscopic working fluid.

Figure 7:
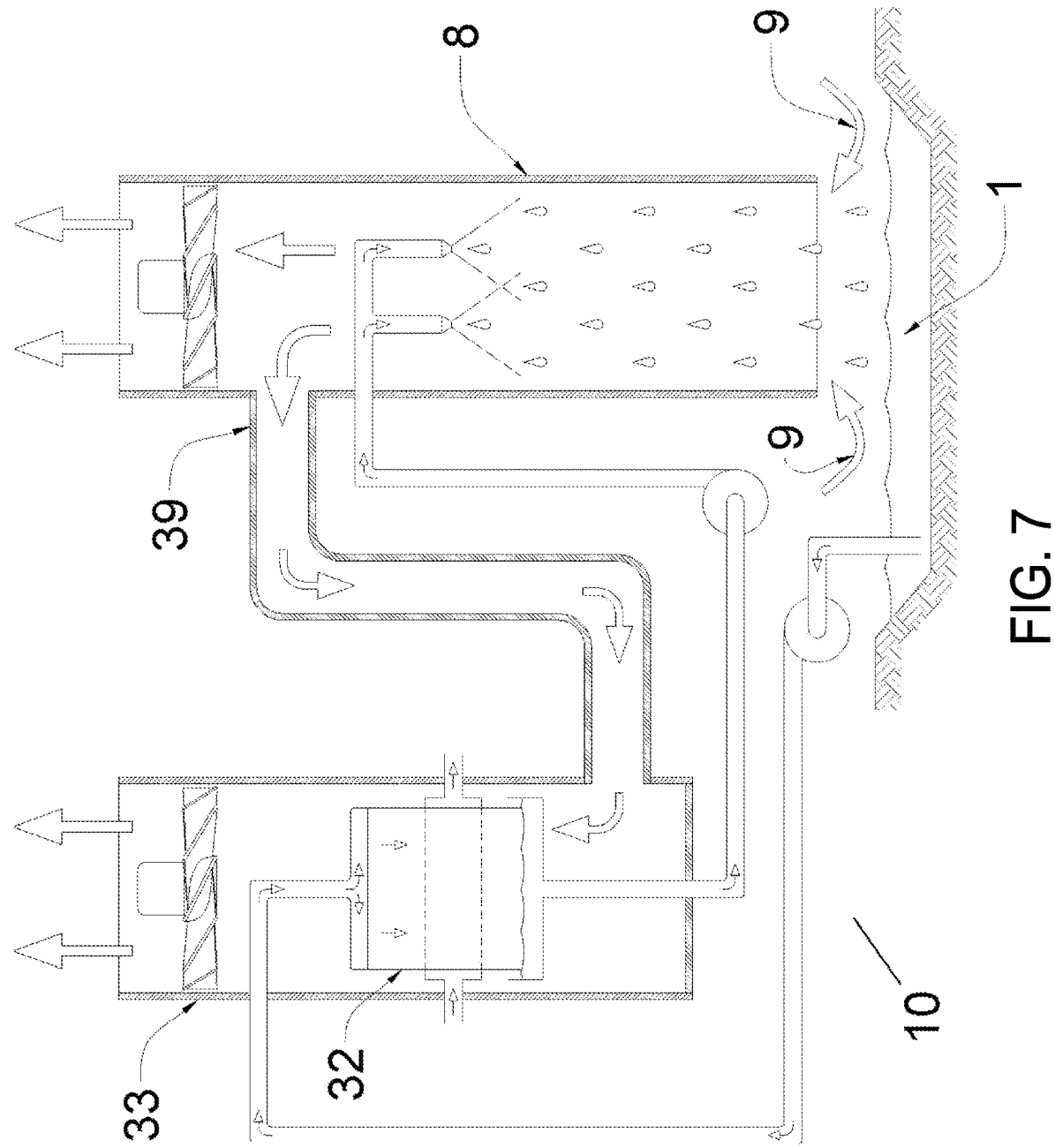
FIG. 7 is a schematic of an embodiment incorporating the air contactor to precondition a falling-film process heat exchanger, according to various embodiments.

A further embodiment of the heat dissipation system 10 is illustrated in drawing FIG. 7. The heat dissipation system 10 incorporates the air contactor latent heat exchanger 8 to condition the airflow passing the film-cooled process sensible heat exchanger 33. As illustrated in drawing FIG. 7, a portion of the airflow exiting air contactor latent heat exchanger 8 at outlet 39 is conducted to the inlet of process heat exchanger housing 33. This airflow then flows past film-cooled process sensible heat exchanger 32 where it receives moisture from hygroscopic film moisture evaporation.

During high ambient humidity conditions when the net moisture vapor content of reservoir hygroscopic solution 1 is increasing, the air at outlet 39 will have lower moisture vapor content than the moisture vapor content of ambient air 9 entering the air contactor latent heat exchanger 8. Therefore, some advantage will be gained by exposing film-cooled process sensible heat exchanger 32 to this lower-humidity airstream from outlet 39 rather than the higher-humidity ambient air. The lower-humidity air will encourage evaporation and latent heat transfer in film-cooled sensible process heat exchanger 32. The embodiment illustrated in drawing FIG. 7 may be preferred for high-humidity conditions since it will enhance the latent component of heat transfer when a film-cooled process heat exchanger, such as 32, is used. However, in any event, during operation of the heat dissipation system 10, the desiccant-based hygroscopic fluid remains stable (hygroscopic desiccant in solution) to prevent crystallization of the desiccant from the desiccant-based hygroscopic fluid.

Figure 8:
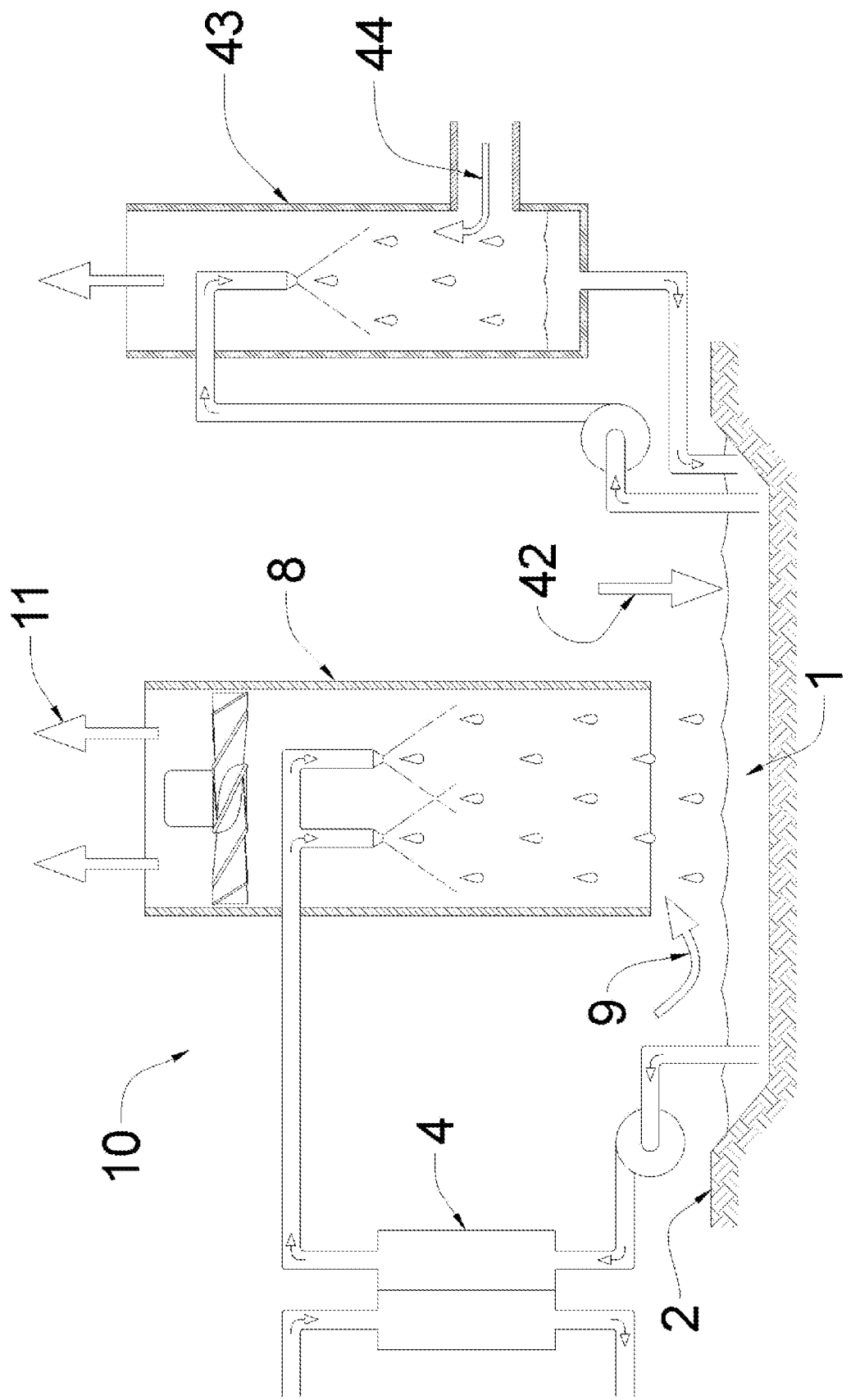
FIG. 8 is a schematic of an embodiment of the present invention incorporating alternate means to increase the moisture content of the working fluid, according to various embodiments.

A further embodiment of the heat dissipation system 10 is illustrated in drawing FIG. 8. The heat dissipation system 10 uses an alternate means for increasing the hygroscopic working fluid moisture content above those that could be obtained by achieving equilibrium with the ambient air. The first alternative presented in drawing FIG. 8 is to increase the moisture content of hygroscopic working fluid 1 directly by addition of liquid water stream 42. In the other alternative presented, hygroscopic working fluid 1 is circulated through absorber latent heat exchanger 43 where it is exposed to gas stream 44. Gas stream 44 has higher moisture vapor availability compared to ambient air 9. Therefore, the hygroscopic working fluid that passes through absorber latent heat exchanger 43 is returned to reservoir 2 having a higher moisture content than that achievable in air contactor latent heat exchanger 8. The source of gas stream 44 may include ambient air into which water has been evaporated either by misting or spraying, an exhaust stream from a drying process, an exhaust stream of high-humidity air displaced during ventilation of conditioned indoor spaces, an exhaust stream from a wet evaporative cooling tower, or a flue gas stream from a combustion source and the associated flue gas treatment systems. The benefit of such alternatives illustrated in drawing FIG. 8 is to increase the moisture content of hygroscopic working fluid 1 during periods of low heat dissipation demand, such as at night, for the purpose of providing additional latent cooling capacity during periods when heat dissipation demand is high so that the desiccant-based hygroscopic fluid remains stable (hygroscopic desiccant in solution) to prevent crystallization of the desiccant from the desiccant-based hygroscopic fluid.

Figure 9:
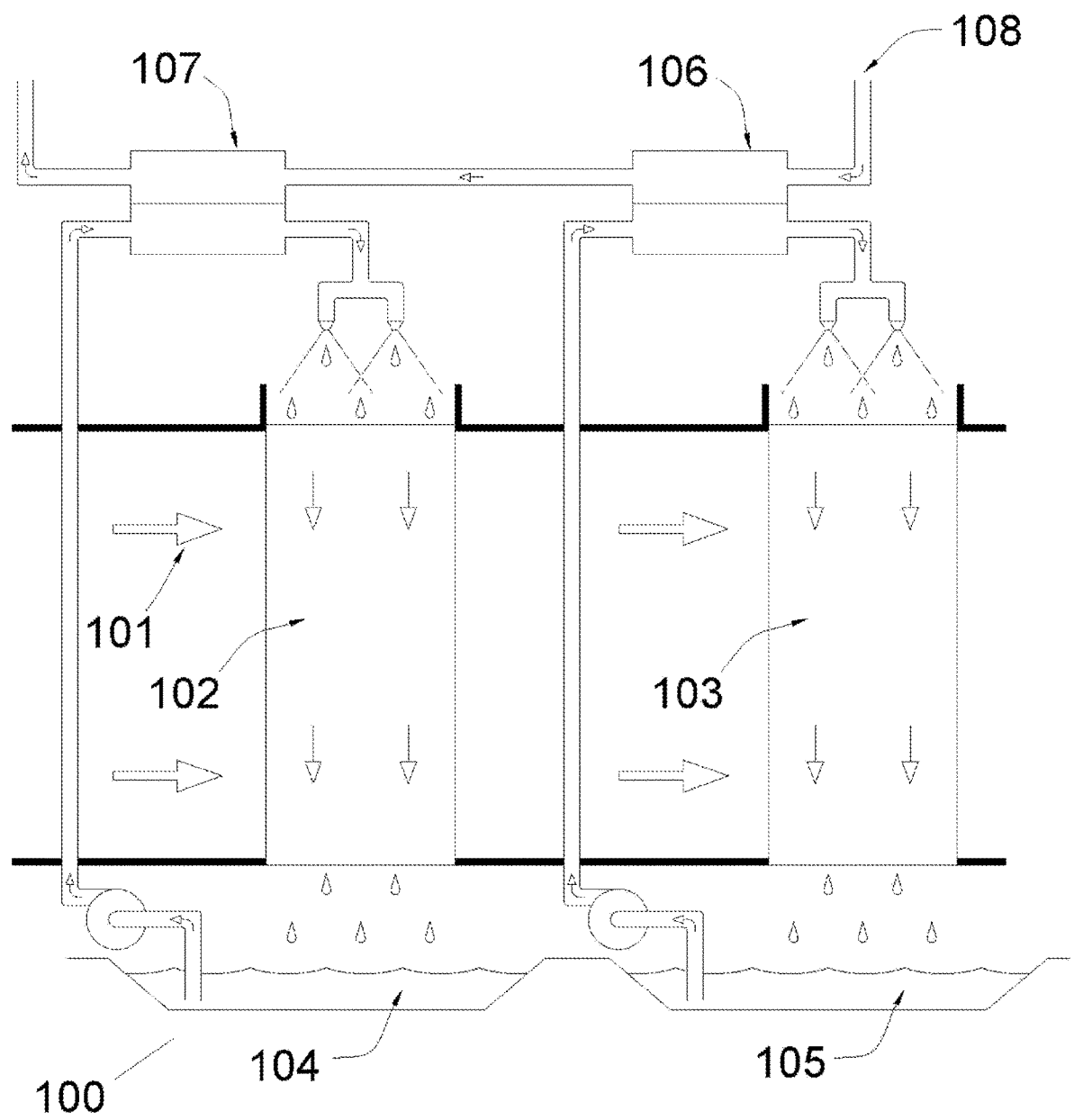
FIG. 9 is a schematic of an embodiment of the present invention incorporating staged multiple cross-flow air contactors, according to various embodiments.

Referring to drawing FIG. 9, a further embodiment of heat dissipation system 100 of the present invention is illustrated using staged multiple crossflow air contactor, direct-contact latent heat exchangers 102 and 103. This embodiment of the present invention includes means to regulate the amount of sensible heat transfer versus latent heat transfer taking place in heat dissipation system 100. In this embodiment of the invention, thermal energy is dissipated at a higher (but still allowable) temperature during cooler ambient periods in order to maintain cooling capacity during peak ambient temperatures.

This embodiment of the heat dissipation system 100 of the invention uses staged sequences of crossflow air contactor heat exchangers 102 and 103 used in conjunction with the process sensible heat exchangers 106 and 107 that interface with the thermal load. Feedback from one stage is passed to adjacent stages in the form of increased vapor pressure in air streams 101 and reduced temperature of the hygroscopic working fluids 104, 105 servicing the thermal load. Combined, these mechanisms reduce the proportion of the thermal load passed to the initial, cooler stage 102 (which contains much of the moisture absorbed during cooler periods) and prevent excessive evaporation from the final, hotter stage 103.

As illustrated in drawing FIG. 9, the staged configuration heat dissipation system 100 utilizes a flow of ambient air 101 that enters the desiccant-to-air crossflow air contactor heat exchanger and passes through the first stage of liquid-air contact 102, and subsequently through the second stage of liquid-air contact 103. Contacting sections 102 and 103 are depicted as crossflow air contactor latent heat exchangers having liquid film-supporting media that is wetted with fluid drawn from reservoirs 104 and 105, respectively. The fluid to be cooled enters the system at 108 and first enters sensible heat exchanger 106 where it undergoes heat transfer with desiccant solution from the second-stage reservoir 105. The partially cooled fluid then enters heat exchanger 107 where it undergoes further heat transfer with desiccant solution from the first-stage reservoir 104.

Key characteristics of this embodiment of the invention include 1) substantially separate working fluid circuits that allow a desiccant concentration gradient to become established between the circuits; 2) each circuit has means for direct contact with an ambient airflow stream which allows heat and mass transfer to occur, and each circuit has means for indirect contact with the fluid to be cooled so that sensible heat transfer can occur; 3) sequential contact of the airflow with each desiccant circuit stage; 4) sequential heat exchange contact of each desiccant circuit with the fluid to be cooled such that the sequential direction of contact between the fluid to be cooled is counter to the direction of contact for the ambient air flow; and finally, 5) the ability to vary the distribution of the heat load among the circuits so as to maximize the amount of reversible moisture cycling by the initial circuit(s) while preventing crystallization of the desiccant from the desiccant-based hygroscopic fluid.

The method of direct air-desiccant solution contact can be conducted using any known-in-the-art heat exchanger, including a spray contactor heat exchanger, falling-film heat exchanger, or wetted structured fill media heat exchanger provided that the desiccant-based hygroscopic fluid remains stable (hygroscopic desiccant in solution) to prevent crystallization of the desiccant from the desiccant-based hygroscopic fluid. A preferred embodiment incorporates falling-film media heat exchanger, 102 and 103, operating in a crossflow configuration. The attached film prevents the formation of fine droplets or aerosols that could be carried out with the air stream as drift, while the crossflow configuration allows for convenient segregation of the desiccant circuits.

Figure 10:
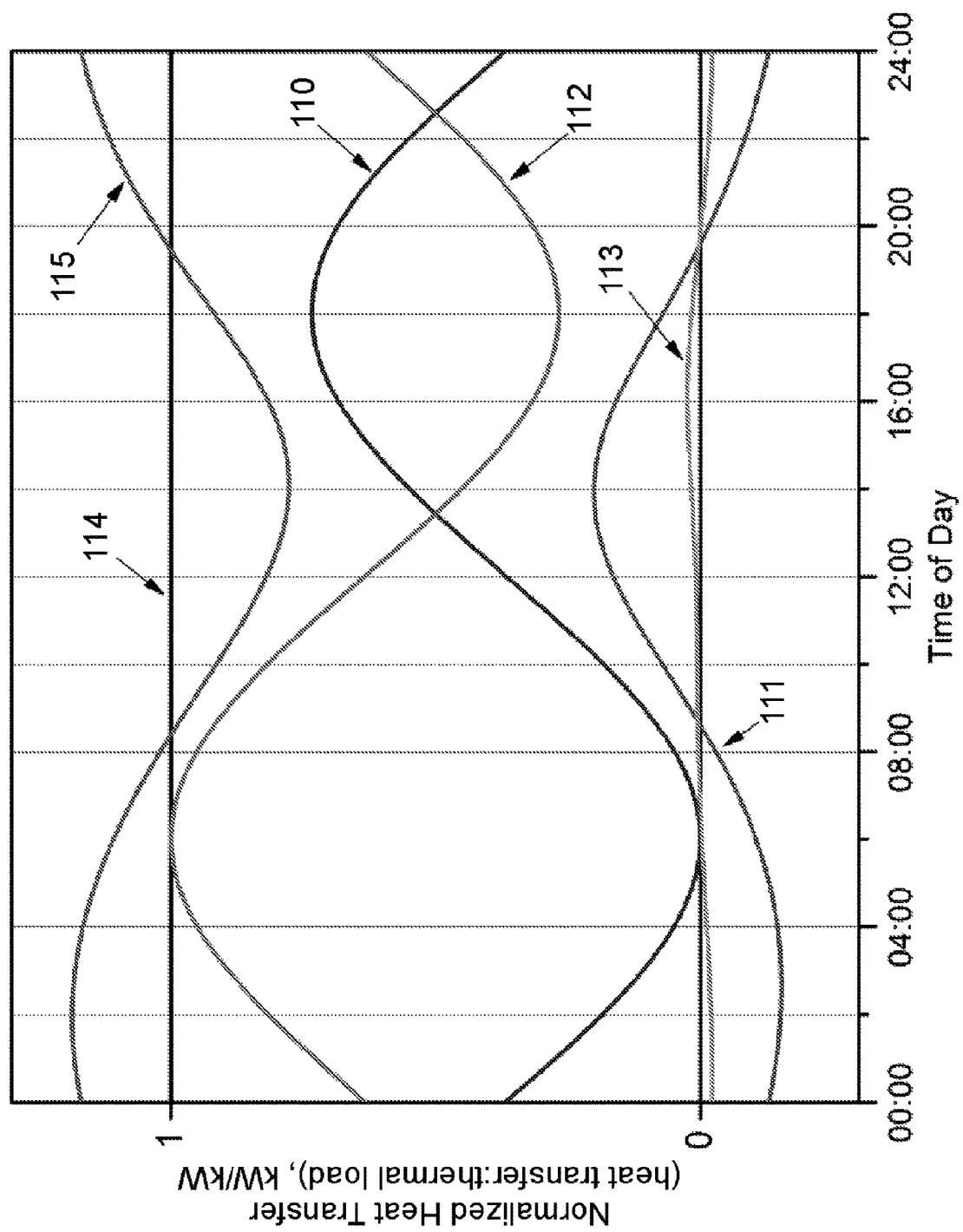
FIG. 10 illustrates the operation of the embodiment of the present invention illustrated in FIG. 9, according to various embodiments.

An example illustrating the preferred operation of the heat dissipation system 100, illustrated in drawing FIG. 9, is illustrated in drawing FIG. 10, that is a plot of the heat-transfer components for a two-stage heat dissipation system 100 using desiccant solution in both stages. In reference to drawing FIG. 9, contacting section 102 would include Stage 1, and contacting section 103 would include stage 2. Each stage of the heat dissipation system 100 has sensible and latent components of heat transfer; the sensible component for Stage 1 is identified as 110, and the Stage 1 latent component is 111. The sensible heat-transfer component and latent heat-transfer component for Stage 2 are identified as 112 and 113, respectively. The total sensible heat rejected by the thermal load is constant for this example and is identified as 114; furthermore, it serves as the normalizing factor for all of the other heat-transfer components and has a value of 1 kW/kW. This is the thermal load transferred to the cooling system in heat exchangers 106 and 107 in drawing FIG. 9.

The final heat-transfer component in drawing FIG. 10 is the sensible heat transferred to the air stream 115 as would be determined from the temperature change of the air across both stages of direct-contact media in drawing FIG. 9.

The phases of operation depicted in drawing FIG. 10 can be distinguished based on the distribution of the total thermal load 114, among Stages 1 and 2, e.g., 110 and 112, respectively. Around 6:00 as illustrated in drawing FIG. 10, this ratio is at a minimum; almost the entire thermal load is being sensibly dissipated by Stage 2 and very little in Stage 1. However, during this period, the hygroscopic fluid in Stage 1 is being recharged by absorbing moisture from the atmosphere as indicated by the negative latent heat value at this time (111). The associated heat of absorption is rejected to the atmosphere in addition to the constant thermal load (114) as indicated by the air sensible heat transfer (115) being higher than the total thermal load.

Between approximately 8:00 and 16:00 as illustrated in drawing FIG. 10, more of the thermal load is transferred from Stage 2 to Stage 1 as the ambient dry-bulb temperature begins to rise. The profile of this progressive transfer of thermal load is chosen to maintain the desired cooling capacity and to control the evaporation of the atmospheric moisture previously absorbed in the Stage 1 hygroscopic fluid. Given the rapid nature of evaporative cooling compared to sensible heat transfer, the thermal load is gradually introduced to Stage 1 in order to obtain maximum benefit of the absorbed moisture, which in drawing FIG. 10 occurs at approximately 14:00 or midafternoon, typically when ambient air temperatures peak for the day. Also at this time, the sensible heat transfer to the air is at a minimum because a portion of the thermal load is being dissipated through the latent cooling, primarily in Stage 1.

At approximately 18:00, as illustrated in drawing FIG. 10, the ratio of Stage 1 to Stage 2 sensible heat transfer is at a maximum; beyond this time, the thermal load is progressively shifted back to Stage 2 as the ambient dry-bulb temperature cools. Transferring heat load from the Stage 1 hygroscopic fluid also allows it to cool and begin to reabsorb moisture from the air.

Operation in the manner described cycles the desiccant solution in Stage 1 between the extreme conditions of 1) minimal thermal load with simultaneous exposure to the minimum daily ambient temperatures and 2) maximum thermal load with exposure to peak daily ambient temperatures. This arrangement increases the mass of water that is reversibly exchanged in the Stage 1 fluid per unit mass of desiccant in the system. Without such "stretching" of the desiccant solution's moisture capacity, an excessively large quantity of solution would be needed to provide the same level of latent-based thermal energy storage.

Moisture vapor absorption and desorption from Stage 1 consequently decreases or increases the vapor pressure experienced at Stage 2, which depresses the latent heat transfer of Stage 2 (item 113). Therefore, the importance of utilizing the Stage 2 hygroscopic fluid as a thermal storage medium is greatly diminished, and the needed quantity of this hygroscopic fluid is reduced compared to the hygroscopic fluid of Stage 1.

Obviously, the daily pattern of ambient air temperatures is not as regular and predictable as that used for the simulation results of drawing FIG. 10. However, the value of this embodiment of the heat dissipation system 10 of the invention is that it is a method to alter the time constant for the cooling system so that cyclic variations having a period on the order of 24 hours and amplitude on the order of those typically encountered in ambient weather can be dampened, and the amount of latent heat transfer is controlled so as to prevent crystallization of the desiccant from the desiccant-based hygroscopic fluid.

While the diagram of drawing FIG. 9 shows only two distinct stages of air contacting and thermal load heat transfer, it is understood that the concept can be extended to include multiple sequences of such stages and that the general conditions just outlined would apply individually to any two subsequent stages or, more broadly, across an entire system between a set of initial contacting stages and a set of following stages.

In the outlined mode of operation, the maximum water-holding capacity is reached when the initial stage(s) have a relatively lower desiccant concentration compared to the following stage(s). The series of stages could contain the same desiccant maintained in a stratified fashion so as to maintain a distinct concentration gradient. Alternatively, the separate stages could employ different desiccant solutions in order to meet overall system goals, including moisture retention capacity and material costs. However, in any event, during operation of the entire heat dissipation system 100, the desiccant-based hygroscopic fluid of each stage must remain stable (hygroscopic desiccant in solution) to prevent crystallization of the desiccant from the desiccant-based hygroscopic fluid.

A further embodiment of the heat dissipation system 100 of the present invention occurs where the primary stage circuit contains pure water and only the subsequent following stage(s) contain a hygroscopic desiccant solution. In this configuration of the heat dissipation system 100 of the present invention, the previously mentioned benefits of conserving latent heat dissipation and conversion of evaporative heat transfer to sensible heating of the air are preserved. However, in this case, the vapor pressure of the initial stage fluid is never below that of the ambient air, and moisture is not absorbed in the initial stage during cooler nighttime temperatures as is the case when a desiccant fluid is used. Again, in any event, during operation of the entire heat dissipation system 100, the desiccant-based hygroscopic fluid of each stage must remain stable (hygroscopic desiccant in solution) to prevent crystallization of the desiccant from the desiccant-based hygroscopic fluid.

Figure 11:
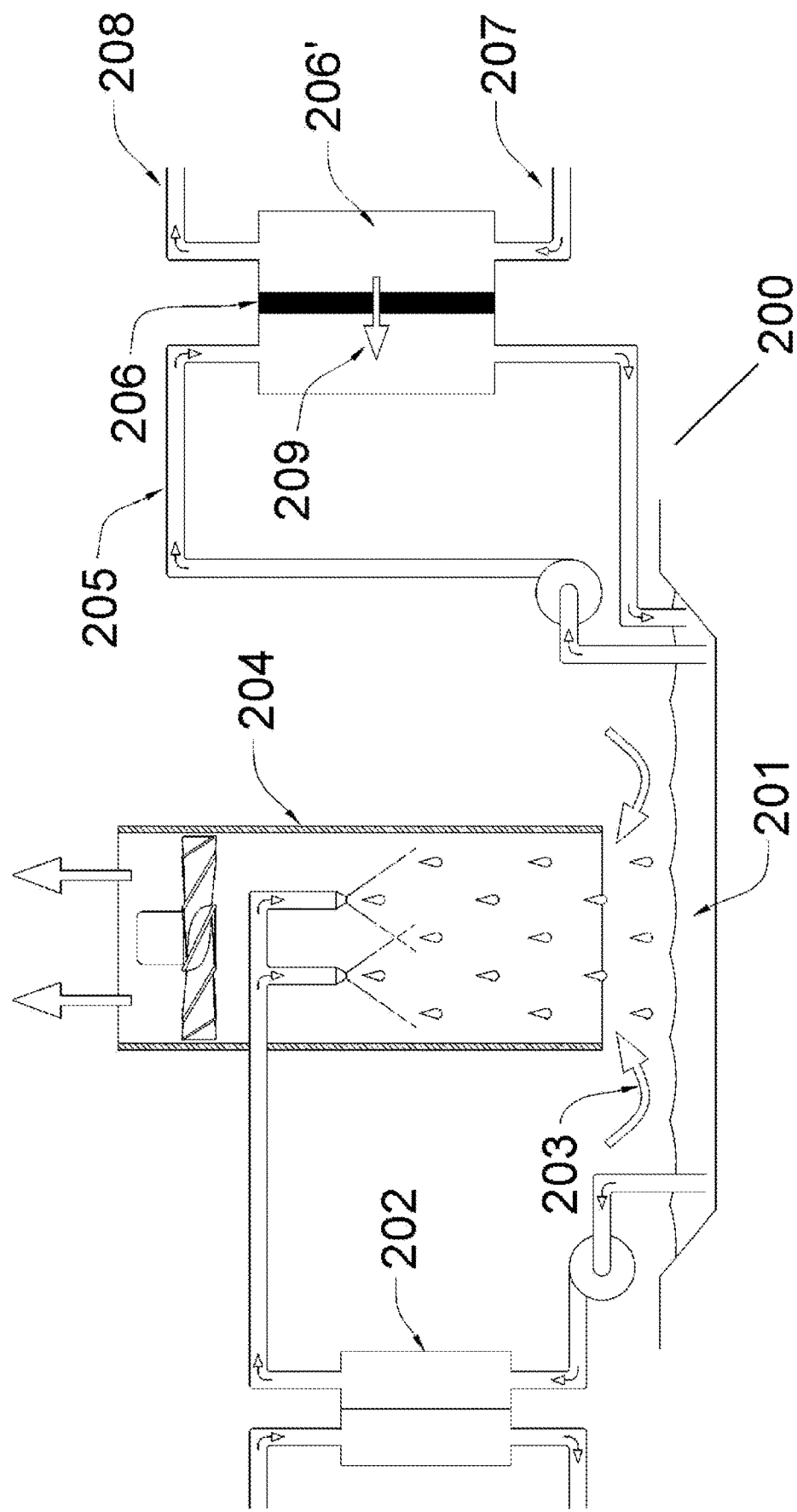
FIG. 11 is a schematic of an embodiment of the present invention including an osmosis membrane moisture extraction cell, according to various embodiments.

Referring to drawing FIG. 11, an alternative embodiment of a method and apparatus of the heat dissipation systems is described for supplementing the water content of a liquid hygroscopic desiccant working fluid in a liquid hygroscopic desiccant-based heat dissipation system 200. In the heat dissipation system 200, the inherent osmotic gradient that exists between the liquid hygroscopic desiccant and a source of degraded-quality water is used to extract relatively pure water through a forward osmosis membrane 206 from the degraded source to the desiccant working fluid. The water transferred by forward osmosis is of sufficient quality to prevent excessive accumulation of undesirable constituents in the hygroscopic desiccant fluid circuit and, therefore, greatly expands the range of water quality that can be used to supplement the operation of a liquid hygroscopic desiccant-based heat dissipation system 200 provided that the desiccant based hygroscopic fluid remains stable (hygroscopic desiccant in solution) to prevent crystallization of the desiccant from the desiccant-based hygroscopic fluid.

Water added to the working fluid of the heat dissipation system 200 provides several benefits to improve the performance of transferring heat to the atmosphere. First, the added water increases the moisture vapor pressure of the hygroscopic desiccant solution, which increases the proportion of latent cooling that can take place when the hot hygroscopic desiccant is cooled by direct contact with ambient air. This effectively increases the quantity of heat that can be dissipated per unit of desiccant-to-air contacting surface. Second, added water content lowers the saturation temperature of the hygroscopic desiccant solution, which is the minimum temperature that the solution can be cooled to by evaporative cooling. By lowering the hygroscopic desiccant solution's saturation temperature, lower cooling temperatures can be achieved for otherwise equivalent atmospheric conditions. Third, water is generally a superior heat-transfer fluid compared to the desiccant hygroscopic solutions that would be employed in a heat dissipation system, such as 200, and adding a higher proportion of it to the hygroscopic desiccant solution will improve the hygroscopic desiccant solution's relevant thermal properties. In a desiccant-based heat dissipation system 200, the cool desiccant hygroscopic fluid is used to sensibly absorb heat from the thermal load in a heat exchanger, so it is preferred that the fluid have good heat-transfer properties. Water addition increases the desiccant hygroscopic solution's specific heat capacity, and it reduces the viscosity. Combined, these property improvements can lower the parasitic pumping load by reducing the needed solution flow rate for a given heat load and by reducing the desiccant hygroscopic solution's resistance to pumping.

In addition to improving the performance of a desiccant hygroscopic fluid heat dissipation system 200, the disclosed invention of the heat dissipation system 200 can also be viewed as an energy-efficient way to reduce the volume of a degraded water source that poses a difficult disposal challenge. Forward osmosis is a highly selective process that can be used to separate water from a wide array of organic and inorganic impurities found in degraded water sources, and when driven by the osmotic gradient between the water source and the desiccant in a heat dissipation system, it is also energy-efficient. Eliminating water in this manner could be an integral part of water management for facilities with zero-liquid-discharge mandates.

As illustrated in drawing FIG. 11, the alternative embodiment is a liquid desiccant-based heat dissipation system 200 coupled with a forward osmosis stage for supplementary water harvesting. General operation of the heat dissipation system 200 includes circulating a liquid desiccant hygroscopic solution 201 through sensible heat exchanger 202 where it absorbs heat from the thermal load. Heated desiccant hygroscopic solution is directly exposed to a flow of ambient air 203 in desiccant-to-air latent heat exchanger 204 where a combination of sensible heat transfer and latent heat transfer takes place to cool the desiccant hygroscopic liquid so that it can continually transfer heat from the thermal load.

Supplementary water is added to the liquid desiccant solution through a second circuit of desiccant hygroscopic solution 205 that flows along one side of forward osmosis membrane 206. On the opposite side of forward osmosis membrane 206 is a flow of degraded quality water from inlet 207 to outlet 208 on one side of forward osmosis stage heat exchanger 206'. Since the osmotic pressure of the desiccant hygroscopic solution 201 is higher than that of the degraded water source flowing through osmosis stage heat exchanger 206', an osmotic pressure gradient is established that is used to transfer water 209 across forward osmosis membrane 206. Transferred water 209 becomes mixed with desiccant hygroscopic solution 201 and is used in the heat dissipation circuit.

Figure 12:
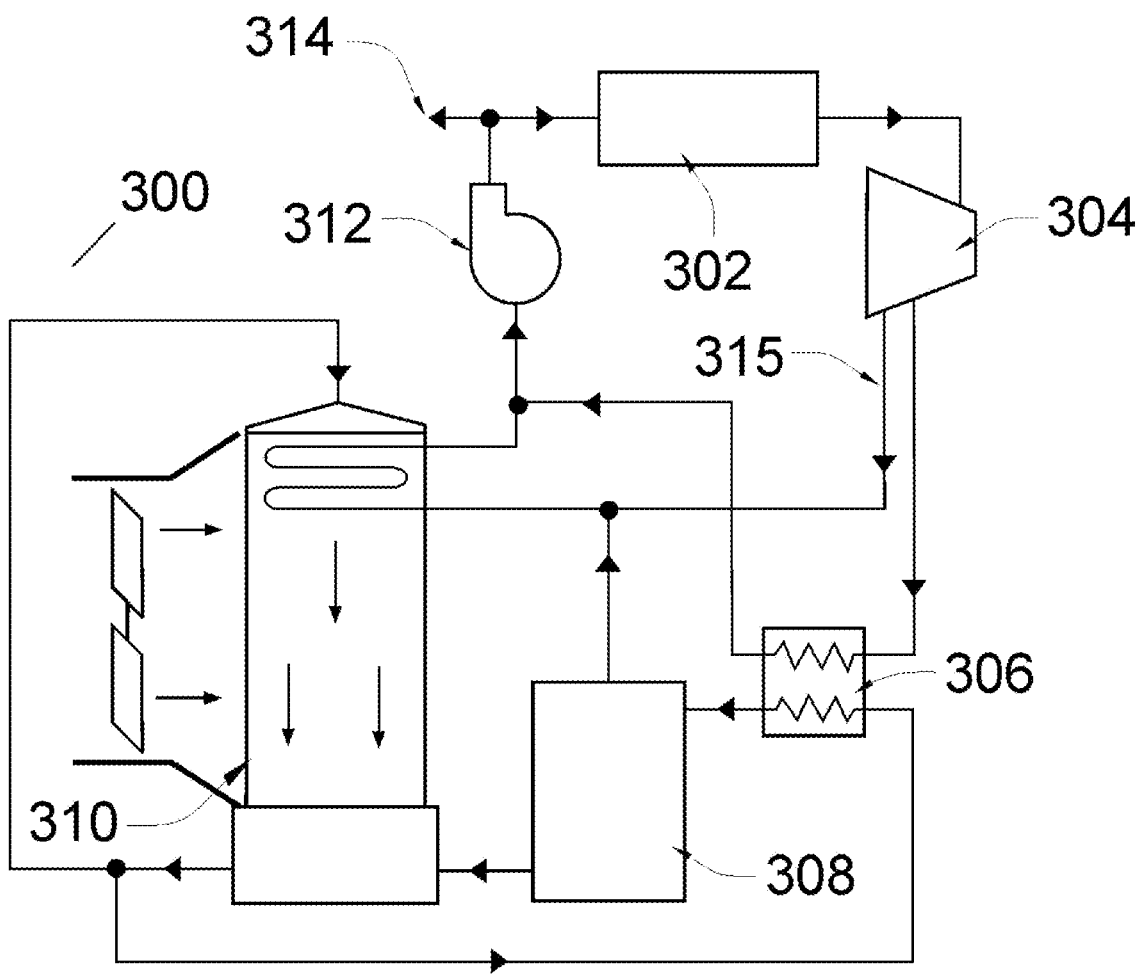
FIG. 12 is a schematic of an embodiment of the present invention including a vacuum evaporator, according to various embodiments.

Moisture in solution may also be extracted from the desiccant hygroscopic liquid in the form of liquid water when excess cooling capacity is present. Drawing FIG. 12 illustrates an embodiment of the heat dissipation system of the present invention used in a steam-type power system 300 including a desiccant evaporator 308 so that released vapor from the desiccant evaporator 308 meets the makeup water and condenses directly in the plant's hygroscopic fluid-based heat dissipation system 310. The steam-type power system 300 includes a boiler 302 producing steam for a power turbine 304. Primary steam turbine exhaust 315 is routed to hygroscopic fluid-based heat dissipation system 310 for condensation back to boiler feed water. A secondary steam exhaust flow is routed to sensible heat exchanger 306 to heat a slipstream of desiccant-based hygroscopic fluid before it enters hygroscopic fluid vacuum evaporator 308. The desiccant evaporator 308 includes a vacuum-type evaporator for evaporating the water from desiccant hygroscopic water from the sensible heat exchanger 306 for the evaporated water to be used as makeup water for the boiler with any excess water exiting the system 300 through excess water tap 314 for storage for subsequent use in the system 300. Depending upon the type of desiccant hygroscopic liquid used in latent heat exchanger 310 which is subsequently evaporated by the desiccant hygroscopic evaporator 308, the amount of excess free water will vary from the desiccant hygroscopic evaporator 308 for use as makeup water for the system 300. However, in any event, during operation of the heat dissipation system, desiccant based hygroscopic fluid must remain stable (hygroscopic desiccant in solution) to prevent crystallization of the desiccant from the desiccant-based hygroscopic fluid.

In embodiments herein, where thermal energy and moisture are described as being transferred between the hygroscopic working fluid and the ambient atmosphere, such as in a fluid-air contactor, the present invention provides a corresponding embodiments wherein thermal energy and moisture are transferred between the hygroscopic working fluid and a cooling gas composition, wherein the cooling gas composition can be any suitable cooling gas composition. For example, the cooling gas composition can include the ambient atmosphere, a gas having less moisture than the ambient atmosphere, a gas having more moisture than the ambient atmosphere, or a combination thereof.

Method of Cooling a Feed Gas.

In various embodiments, the present invention provides a method of cooling a feed gas. The method includes any embodiment of a method described herein that includes a hygroscopic working fluid, wherein thermal energy is transferred from the feed gas to the hygroscopic working fluid. In some embodiments, the thermal energy can be transferred directly, such as wherein the hygroscopic working fluid and the feed gas both enter the same heat transfer device. In some embodiments, the thermal energy can be transferred indirectly, such as wherein one or more intermediate heat transfer media are used to transfer the thermal energy from the feed gas to the hygroscopic working fluid.

The feed gas can be any suitable feed gas. The feed gas can include or can be any suitable one or more gases. The feed gas can include the ambient atmosphere, a gas having more water vapor than the ambient atmosphere, a gas having less water vapor than the ambient atmosphere, or a combination thereof. In some embodiments, the feed gas is the ambient atmosphere. In some embodiments, the feed gas is taken from an environment in need of cooling, dehumidification, or a combination thereof, and then returned thereto after being cooled by the method. The feed gas can include humidity from at least one of a spray, mist, or fog of water directly into the feed gas composition, an exhaust gas stream from a drying process, an exhaust gas stream consisting of high-humidity rejected air displaced during the ventilation of conditioned indoor spaces, an exhaust airstream from a wet evaporative cooling tower, and an exhaust flue gas stream from a combustion source.

The method can include using the cooled feed gas in any suitable way, such as using the cooled feed gas for HVAC applications, or feeding the cooled feed gas to a mechanical apparatus. The method can include feeding the cooled feed gas to a rotary mechanical device, such as a turbine. In some embodiments, the turbine is a combustion turbine, such as a natural gas combustion turbine. The turbine can be used to generate electrical power. The cooled feed gas can allow the turbine to operate more efficiently than the uncooled feed gas. The feed gas heat exchanger and the process heat exchanger can be parts of a turbine inlet chilling system (TIC).

In some examples, the method can include transferring thermal energy from the feed gas to a process fluid (e.g., via the feed gas heat exchanger, such as a chiller including a condenser, such as cooling coils), and then transferring thermal energy from the process fluid to the hygroscopic working fluid. The thermal energy can be transferred directly from the feed gas to the process fluid, without intermediate heat transfer media. The thermal energy can be transferred directly from the process fluid to the hygroscopic working fluid, or the thermal energy can be transferred from the process fluid to a heat transfer medium (e.g., a chiller working fluid) and then from the heat transfer medium to the hygroscopic working fluid. Any suitable method of transferring thermal energy from the feed gas to the process fluid can be used, such as those described in U.S. RE 44,815 E1, hereby incorporated by reference in its entirety.

The method can include transferring thermal energy from a heated process fluid to the hygroscopic working fluid in a process heat exchanger, to form a cooled process fluid. The method can include transferring thermal energy from the feed gas to the cooled process fluid in a feed gas heat exchanger, to form a cooled feed gas and the heated process fluid. The method can include dissipating thermal energy from the hygroscopic working fluid to a cooling gas composition with a fluid-air contactor. The method can include transferring moisture between the hygroscopic working fluid and the cooling gas composition with the fluid-air contactor. The method can include adding at least part of the condensate to the hygroscopic working fluid. In some embodiments, the method can include feeding the cooled feed gas to a rotary mechanical device, such as a turbine, such as a combustion turbine.

The process fluid can include any one or more suitable heat transfer media. The process fluid can be a single phase (gas or liquid) that requires sensible cooling or it could be a two-phase fluid that undergoes a phase change in the process heat exchanger, e.g., condensation of a vapor into a liquid. The process fluid can include water, calcium chloride brine, sodium chloride brine, an alcohol, ethylene glycol, a polyethylene glycol, propylene glycol, a polypropylene glycol, a mineral oil, a silicone oil, diphenyl oxide, biphenyl, an inorganic salt, a Therminol® brand heat-transfer fluid, a Dowtherm™ brand heat-transfer fluid, a refrigerant (e.g., a fluorinated hydrocarbon), or a combination thereof. Each one or more components of the process fluid can be any suitable weight percent of the process fluid, such as about 0.001 wt % to about 100 wt %, or about 0.01 wt % to about 50 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more.

In some embodiments, cooling the feed gas can include condensing at least some water out of the feed gas, to form a condensate. At least part of the condensate can be added to the hygroscopic working fluid. In some embodiments, the method can provide sufficient condensate such that the amount of water lost from the hygroscopic fluid during the method (e.g., which can include or be limited to water lost from the hygroscopic working fluid to the cooling gas composition) is equal to or less than the amount of condensate produced, providing water-neutral operation. For example, a rate of formation of the condensed liquid can be equal to or greater than a rate than a rate of moisture mass transfer between the hygroscopic working fluid and the cooling gas composition in the fluid-air contactor. Over a period of time, such as 1 min or less, or less than, equal to, or greater than 30 min, 1 h, 2 h, 3, 4, 5, 6, 7, 8, 9, 10, 12, 14, 16, 18, 20, 22, 24 h, 1.5 d, 2 d, 3, 4, 5, 6, 8, 10, 12, or about 14 days or more, the total amount of the condensate generated by the method can be equal to or can exceed the total amount of water lost from the hygroscopic working fluid during the method.

The method can include transferring thermal energy from a heated process fluid to the hygroscopic working fluid in a process heat exchanger, to form a cooled process fluid. The method can include condensing liquid from a feed gas on a heat transfer surface of a feed gas heat exchanger in contact with the cooled process fluid, to form a cooled feed gas, a heated process fluid, and a condensate. The method can include dissipating thermal energy from the hygroscopic working fluid to a cooling gas composition with a fluid-air contactor. The method can include transferring moisture between the hygroscopic working fluid and the cooling gas composition with the fluid-air contactor. The method can include adding at least part of the condensate to the hygroscopic working fluid.

The cooled process fluid can have a temperature that is at or below the dew point of the feed gas, such that the cooled process fluid can cool the feed gas to a temperature wherein water vapor in the feed gas condenses into liquid water. The cooled process fluid can have a sub-ambient temperature. The cooled process fluid can have a temperature that is about 1° C. to about 100° C. below the temperature of the feed gas (e.g., when the feed gas is ambient atmosphere, below the ambient temperature), about 1° C. to about 50° C. below the temperature of the feed gas, about 2° C. to about 20° C. below the temperature of the feed gas, or less than, equal to, or more than about 1° C. below the temperature of the feed gas, about 2° C., 3, 4, 5, 6, 8, 10, 12, 14, 16, 18, 20, 25, 30, 35, 40, 45, 50, 55, 60, 65, 70, 75, 80, 85, 90, 95, or about 100° C. or more less than the temperature of the feed gas. The condensing of the liquid from the feed gas can include transferring thermal energy from the feed gas to the cooled process fluid.

The process heat exchanger (e.g., the heat exchanger that provides transfer of thermal energy between the process fluid and the hygroscopic working fluid with or without one or more intermediate heat transfer media) can be a chiller. The chiller can move thermal energy from the heated process fluid to the hygroscopic working fluid via a chiller working fluid (e.g., a intermediate heat transfer medium between the heated process fluid and the hygroscopic working fluid). The chiller can include a condenser of a refrigeration cycle that occurs within the chiller. The chiller can include a compressor that compresses a chiller working fluid prior to transferring thermal energy from the compressed chiller working fluid to the hygroscopic working fluid. The chiller can transfer heat directly from the compressed chiller working fluid to the hygroscopic working fluid without any intermediate heat exchangers and without any intermediate heat transfer medium. The chiller can include a valve that allows the chiller working fluid to expand prior to transferring thermal energy from the heated process fluid to the expanded chiller working fluid.

The chiller working fluid can include any one or more suitable heat transfer media. The chiller working fluid can be a single phase (gas or liquid) that requires sensible cooling or it can be a two-phase fluid that undergoes a phase change in the chiller, e.g., a refrigerant that undergoes condensation from a vapor (e.g., a gas) into a liquid and then back to a vapor. The chiller working fluid can include water, calcium chloride brine, sodium chloride brine, an alcohol, ethylene glycol, a polyethylene glycol, propylene glycol, a polypropylene glycol, a mineral oil, a silicone oil, diphenyl oxide, biphenyl, an inorganic salt, a Therminol® brand heat-transfer fluid, a Dowtherm™ brand heat-transfer fluid, a refrigerant (e.g., one or more of a fluorinated hydrocarbon, a hydrofluoroolefin, carbon dioxide, ammonia, and the like), an absorption refrigeration pair (e.g., one or more of ammonia-water, water-lithium bromide, and the like), or a combination thereof. Each one or more components of the chiller working fluid can be any suitable weight percent of the chiller working fluid, such as about 0.001 wt % to about 100 wt %, or about 0.01 wt % to about 50 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more.

The method can include transferring heat from the feed gas to the cooled process fluid immediately or shortly after forming the cooled process fluid without storing the cooled process fluid. The method can include storing the cooled process fluid for a time period prior to transferring heat from the feed gas thereto, such as in a process fluid storage area (e.g., a tank, which can be insulated or uninsulated). The cooled process fluid can be stored for any suitable time prior to transferring heat thereto, such as about 1 minute to about 7 days, or about 1 min or less, or less than, equal to, or greater than 30 min, 1 h, 2 h, 3, 4, 5, 6, 7, 8, 9, 10, 12, 14, 16, 18, 20, 22, 24 h, 1.5 d, 2 d, 3, 4, 5, 6, 8, 10, 12, or about 14 days or more.

The method can include adding at least some of the condensate to the hygroscopic working fluid immediately or shortly after forming the condensate without storing the condensate. The method can include storing the condensate for a time period prior to adding the condensate to the hygroscopic working fluid, such as in a condensate storage area (e.g., a tank). The condensate can be stored for any suitable time prior to adding a portion thereof to the hygroscopic working fluid, such as about 1 minute to about 10 year, about 1 minute to about 7 days, or about 1 min or less, or less than, equal to, or greater than 30 min, 1 h, 2 h, 3, 4, 5, 6, 7, 8, 9, 10, 12, 14, 16, 18, 20, 22, 24 h, 1.5 d, 2 d, 3, 4, 5, 6, 8, 10, 12, 14 d, 1 month, 2, 4, 6, 8, 10, 12 months, 1.5 years, 2, 3, 4, 5, 6, 7, 8, 9, or about 10 years or more.

The method can include maintaining the hygroscopic working fluid to prevent crystallization of the desiccant from the desiccant-based hygroscopic working fluid. For example, the method can include maintaining the hygroscopic working fluid at a sufficiently high temperature, maintaining the wt % water of the hygroscopic working fluid at a sufficiently high level, or a combination thereof, to substantially avoid crystallization of the desiccant from the desiccant-based hygroscopic working fluid.

The cooling gas composition can be any suitable cooling gas composition. In some embodiments, the cooling gas composition can include or can be the ambient atmosphere. In various embodiments, the cooling gas composition can include or can be the ambient atmosphere, a gas having more water vapor than the ambient atmosphere (e.g., humidified ambient air), a gas having less water vapor than the ambient atmosphere (e.g., dehumidified ambient air), or a combination thereof. The gas having more or less water vapor than the ambient atmosphere can include at least one ambient air into which water has been evaporated by misting or spraying, an exhaust stream from a drying process, an exhaust stream of high-humidity air displaced during ventilation of conditioned indoor spaces, an exhaust stream from a wet evaporative cooling tower, and a flue gas stream from a combustion source and the associated flue gas treatment systems. In various embodiments, the cooling gas composition includes humidity from at least one of a spray, mist, or fog of water directly into the cooling gas composition, an exhaust gas stream from a drying process, an exhaust gas stream consisting of high-humidity rejected air displaced during the ventilation of conditioned indoor spaces, an exhaust airstream from a wet evaporative cooling tower, and an exhaust flue gas stream from a combustion source.

In some embodiments, dissipating thermal energy from the hygroscopic working fluid to the cooling gas composition includes dissipating thermal energy from the hygroscopic working fluid to the ambient atmosphere using the fluid-air contactor and dissipating thermal energy from the hygroscopic working fluid to a gas having either less water vapor or more water vapor than the ambient atmosphere using the fluid-air contactor. In some embodiments, transferring moisture between the hygroscopic working fluid and the cooling gas composition includes transferring moisture between the hygroscopic working fluid and the ambient atmosphere using the fluid-air contactor and transferring between the hygroscopic working fluid and a gas having either less water vapor or more water vapor than the ambient atmosphere using the fluid-air contactor.

The hygroscopic working fluid can be any suitable hygroscopic working fluid. The hygroscopic working fluid can be a low-volatility working fluid (e.g., a working fluid having a boiling point equal to or greater than water). The hygroscopic working fluid can be an aqueous solution, e.g., including about 20 wt % to about 99.999 wt % water, or about 50 wt % to about 99 wt % water, or about 20 wt % or less, or less than, equal to, or more than about 22 wt % water, 24 wt %, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 91, 92, 93, 94, 95, 96, 97, 98, 99, 99.9, 99.99, or about 99.999 wt % or more water. In various embodiments, the hygroscopic working fluid can include at least one of sodium chloride (NaCl), calcium chloride ($CaCl_2$)), magnesium chloride ($MgCl_2$), lithium chloride (LiCl), lithium bromide (LiBr), zinc chloride ($ZnCl_2$), sulfuric acid ($H_2SO_4$), sodium hydroxide (NaOH), sodium sulfate ($Na_2SO_4$), potassium chloride (KCl), calcium nitrate (Ca[$NO_3$]$_2$), potassium carbonate ($K_2CO_3$), ammonium nitrate ($NH_4NO_3$), ethylene glycol, diethylene glycol, propylene glycol, triethylene glycol, and dipropylene glycol. The concentration of any one or more of the preceding components in the hygroscopic working fluid can be about 0 wt % to about 80 wt %, or about 0.01 wt % to about 50 wt %, or about 0 wt %, or about 0.01 wt % or less, or less than, equal to, or more than about 0.1 wt %, 1, 2, 3, 4, 5, 6, 7, 8, 9, 10, 12, 14, 16, 18, 20, 22, 24, 26, 28, 30, 35, 40, 45, 50, 55, 60, 65, 70, 75 wt %, or about 80 wt % or more. In various embodiments, the hygroscopic working fluid includes an aqueous solution that includes calcium chloride ($CaCl_2$)).

The fluid-air contactor can be any suitable fluid-air contactor, such as any suitable fluid-air contactor described herein. The method can include cooling the process heat exchanger by a flowing film of the hygroscopic working fluid enabling both sensible and latent heat transfer to occur the transferring of thermal energy from the heated process fluid. The fluid-air contactor can operate in at least one relative motion including countercurrent, cocurrent, or crossflow operation. In some embodiments, the performance of the fluid-air contactor can be enhanced by at least one of forced or induced draft of the cooling gas composition by a powered fan, natural convection airflow generated from buoyancy differences between heated and cooled air, and induced flow of the cooling gas composition generated by the momentum transfer of sprayed working fluid into the cooling gas composition. Transferring moisture between the hygroscopic working fluid and the cooling gas composition can include using a working fluid-air contactor and a vacuum evaporator. Transferring moisture between the hygroscopic working fluid and the cooling gas composition can include the use of a forward osmosis membrane of a forward osmosis water extraction cell.

In various embodiments, the only water added to the hygroscopic working fluid during the method is the condensate. In some embodiments, the heat transfer from the feed gas can be enhanced by addition of moisture to the hygroscopic working fluid using at least one of: direct addition of liquid water to the hygroscopic working fluid; absorption of relatively pure water directly into the hygroscopic fluid through the forward osmosis membrane of a forward osmosis water extraction cell; absorption of vapor-phase moisture by the working fluid from a moisture-containing gas stream outside of the process air contactor where the moisture-containing gas stream including at least one of ambient air into which water has been evaporated by spraying or misting flue gas from a combustion source and its associated flue gas treatment equipment; exhaust gas from a drying process; rejected high-humidity air displaced during ventilation of conditioned indoor air; and an exhaust airstream from a wet evaporative cooling tower. In some embodiments, the process heat exchanger is placed at the inlet to the fluid-air contactor for raising humidity levels of the cooling gas composition. In some embodiments, the process heat exchanger is placed at the outlet of said air contactor for lowering humidity of the cooling gas composition.

Figure 13:
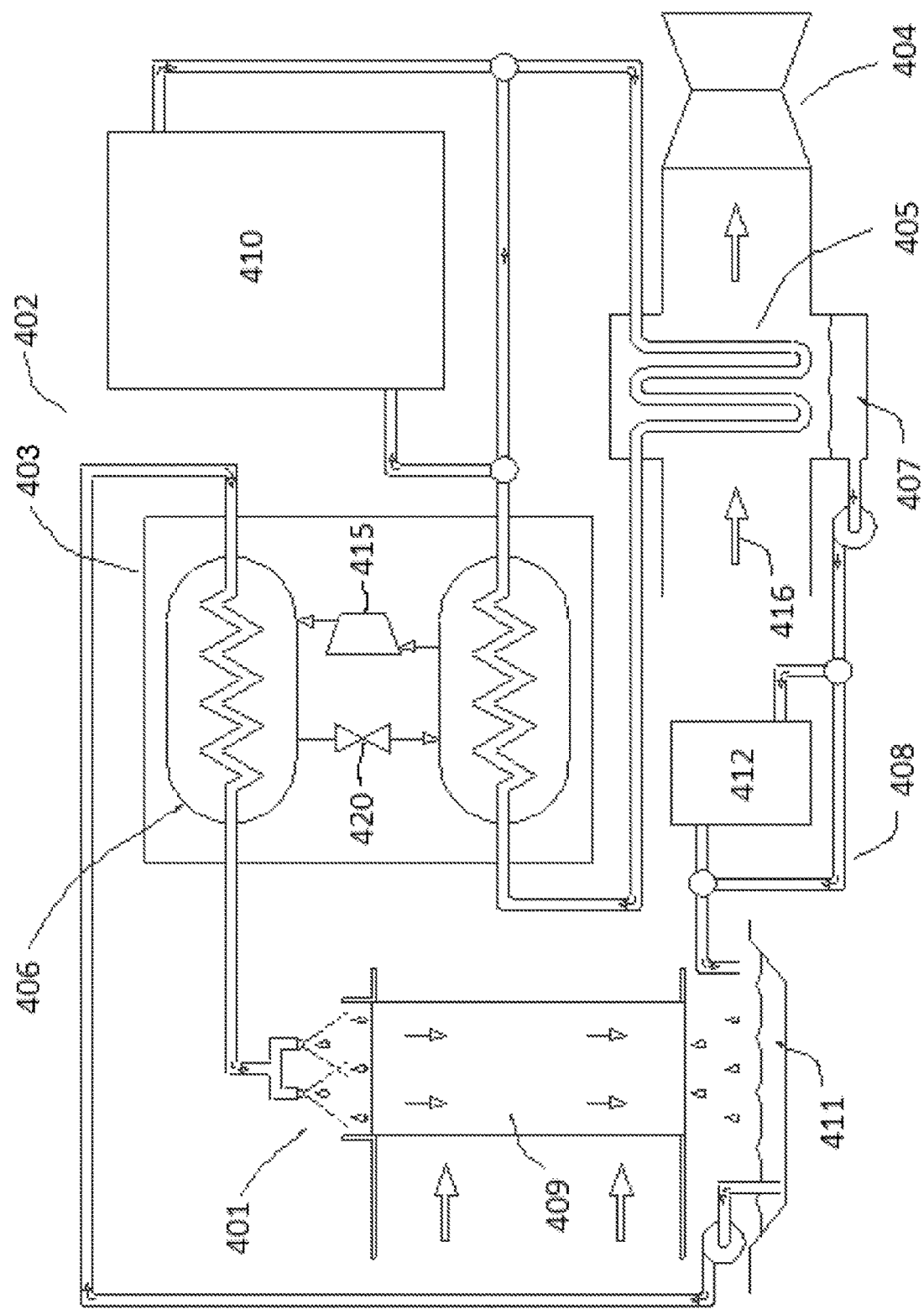
FIG. 13 illustrates an embodiment of a system that can be used to cool a feed gas using a hygroscopic working fluid, according to various embodiments.

FIG. 13 illustrates an example of a system that can be used to perform an embodiment of the method of cooling a feed gas 416, using desiccant-based hygroscopic fluid cooling system 401 to meet the heat rejection needs of TIC system 402. Sub-ambient cooling temperatures are generated by vapor-compression chiller 403 that cools a circulating flow of water (or other heat transfer fluid) to chill the ambient air entering combustion turbine 404 using heat exchanger 405. The chiller can include compressor 415 and valve 420. Heat from chiller condenser 406 is removed and dissipated by the desiccant-based hygroscopic fluid cooling system. Because of the favorable operating conditions associated with TIC, a less corrosive desiccant such as $CaCl_2$) can be used to cool the condenser directly using appropriate materials such as titanium, which is an available option for these large chillers. This option negates the need for an intermediate heat exchanger which improves performance by eliminating 3° to 4° C. from the overall temperature differential between the condensing refrigerant and the ambient air dry bulb temperature.

During operation of the TIC system, the turbine inlet ambient air stream is frequently cooled below its dew-point in heat exchanger 405 resulting in condensed moisture collection in basin 407. Under high humidity conditions where TIC is favored, this latent cooling load can exceed 50% of heat exchanger 5's total cooling load. The rate of condensed water collection in this case would exceed 40% of the evaporative makeup water requirement for a conventional wet cooling tower used to cool the chiller's condenser. This rate is a substantial fraction of consumptive water use but is insufficient to make TIC a water-neutral process using conventional wet cooling. The condensed water is largely free of dissolved scale-forming constituents and is highly suitable to be used as supplemental water in a desiccant-based hygroscopic fluid cooling system using transfer line 408. Moisture addition to the desiccant working fluid lowers the desiccant concentration and increases the latent cooling potential of the direct contact air-desiccant process, 409, resulting in better cooling performance that is manifested as lower cold desiccant temperatures for a constant cooling load or a higher cooling capacity for a fixed set of desiccant temperatures.

The previous description assumes coincident operation of chiller 403 and operation of heat exchanger 405, however, there are instances where the operation of the chiller is decoupled from the need for inlet chilling by the use of a heat transfer fluid storage tank 410. This configuration allows the chiller to run at night or other off-peak periods when power demand is low. Ambient temperatures are also lower during these periods which aids condenser heat rejection to the atmosphere. When thermal storage is used water condensate is not formed when the chiller is in operation but instead comes when the stored cold fluid is used to chill the incoming turbine air. This condensate can be directly mixed with the desiccant working fluid and stored in the cooling system's basin 411 until the chiller and desiccant cooling system are activated at a later time, or it can be stored in tank 412 and metered into the desiccant working fluid at times that are most beneficial for efficient cooling performance. System.

In various embodiments, the present invention provides a system for heat dissipation that includes a hygroscopic working fluid. The system can be any suitable system that can be used to perform any embodiment of the method described herein.

In some embodiments, the system includes a process heat exchanger configured to transfer thermal energy from a heated process fluid to a hygroscopic working fluid to form a cooled process fluid. The system can include a feed gas heat exchanger configured to condense liquid from a feed gas on a heat transfer surface of the feed gas heat exchanger in contact with the cooled process fluid, to form a cooled feed gas and a condensate. The system can include a fluid-air contactor configured to dissipate heat from the hygroscopic working fluid to a cooling gas composition, and configured to transfer moisture between the hygroscopic working fluid and the cooling gas composition. The system can be configured to add at least part of the condensate to the hygroscopic working fluid.

The feed gas heat exchanger and the process heat exchanger can be parts of a turbine inlet chilling system (TIC), such as for a natural gas combustion turbine. The system can be configured to operate in at least water-neutral operation with respect to moisture loss from the hygroscopic working fluid and moisture gain from the condensate. The system can be configured to maintain the hygroscopic working fluid to prevent crystallization of the desiccant from the desiccant-based hygroscopic working fluid.

The process heat exchanger can include or can be a chiller that moves thermal energy from the heated process fluid to the hygroscopic working fluid via a chiller working fluid. The process heat exchanger can include a condenser of a refrigeration cycle. For example, the process heat exchanger can include the condenser of a chiller that rejects thermal energy from the heated process fluid to the hygroscopic working fluid via the chiller's refrigeration circuit. The chiller can include a compressor that is configured to compress a chiller working fluid prior to transferring thermal energy from the compressed chiller working fluid to the hygroscopic working fluid. The chiller can be configured to transfer heat directly from the compressed chiller working fluid to the hygroscopic working fluid without any intermediate heat exchangers and without any intermediate heat transfer medium. The chiller can include a valve that is configured to allow the chiller working fluid to expand prior to transferring thermal energy from the heated process fluid to the expanded chiller working fluid.

The system can include a process fluid storage area configured to store the cooled process fluid for a period of time before placing the cooled process fluid in the feed gas heat exchanger. The system can include a condensate storage area configured to store the condensate for a period of time before placing at least a portion of the condensation in the hygroscopic working fluid.

EXAMPLES

Various embodiments of the present invention can be better understood by reference to the following Examples which are offered by way of illustration. The present invention is not limited to the Examples given herein.

Examples 1 and 2 are performance models based on experiments that were performed.

Example 1

In this Example, a TIC system operates at a ambient design point value of 95° F. (35° C.) dry bulb temperature and a corresponding 75° F. (24° C.) wet bulb temperature. The chilling system cools the incoming ambient air to 50° F. (10° C.) in order to benefit the operating performance of the combustion turbine of a natural gas combined cycle power plant. Approximately 55 MW (thermal) of cooling is required for this application, 37% of which is used for condensing water out of the air (latent cooling load), and the remainder is used to sensibly cool the remaining air. The resulting condensate is collected at a rate of 135 gpm (8.55 kg/s). Under these conditions the condenser of the TIC must reject approximately 65 MW (thermal) to the ambient environment. If a wet evaporative cooling system were used, it would consume 453 gpm (28.6 kg/s) of water to makeup evaporation losses assuming a system designed to achieve a condenser temperature of 108° F. (42° C.).

Under daytime operation a desiccant-based cooling system designed for a 40° F. (22° C.) temperature difference between the ambient dry bulb temperature and that of the condenser would consume no water, but would result in a higher condenser temperature of 135° F. (57° C.). However, by consuming the condensate from the air chilling process, the condenser temperature could be reduced by 7° F. (4° C.) with no other changes to the cooling system's size or air flow. This improvement in performance represents the equivalent of increasing the size of a totally dry cooling system by 22%, which can be completely avoided by making use of the TIC system's own produced water.

Example 2

If instead thermal storage is used to provide inlet air chilling during the day, the same quantity of condensate would be collected but the operation of the cooling system would be deferred to the cooler nighttime hours. Assuming a 78° F. dry bulb temperature and a 75° F. wet bulb temperature, the same size desiccant-based system as used in Example 1 could cool the condenser to 117° F. (47° C.) in a completely dry mode with no water consumption. Alternatively, if the condensate collected during the day were consumed as evaporative makeup in the same cooling system, the resulting condenser temperature would be 109° F. (42.8° C.), nearly equaling the cooling performance of a wet system but by using only the collected condensate as makeup.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the invention as defined in the following claims.

Additional Embodiments

The following exemplary embodiments are provided, the numbering of which is not to be construed as designating levels of importance:

Embodiment 1 provides a method for heat dissipation using a hygroscopic working fluid, the method comprising:

transferring thermal energy from a heated process fluid to the hygroscopic working fluid in a process heat exchanger, to form a cooled process fluid;

condensing liquid from a feed gas on a heat transfer surface of a feed gas heat exchanger in contact with the cooled process fluid, to form a cooled feed gas, the heated process fluid, and a condensate;

dissipating thermal energy from the hygroscopic working fluid to a cooling gas composition with a fluid-air contactor;

transferring moisture between the hygroscopic working fluid and the cooling gas composition with the fluid-air contactor; and adding at least part of the condensate to the hygroscopic working fluid.

Embodiment 2 provides the method of Embodiment 1, wherein the cooled process fluid has sub-ambient temperature Embodiment 3 provides the method of any one of Embodiments 1-2, wherein the condensing of the liquid from the feed gas comprises transferring thermal energy from the feed gas to the cooled process fluid.

Embodiment 4 provides the method of any one of Embodiments 1-3, further comprising feeding the cooled feed gas to a rotary mechanical device.

Embodiment 5 provides the method of any one of Embodiments 1-4, further comprising feeding the cooled feed gas to a turbine.

Embodiment 6 provides the method of any one of Embodiments 1-5, further comprising feeding the cooled feed gas to a combustion turbine.

Embodiment 7 provides the method of any one of Embodiments 1-6, wherein the feed gas comprises the ambient atmosphere, a gas having more water vapor than the ambient atmosphere, a gas having less water vapor than the ambient atmosphere, or a combination thereof.

Embodiment 8 provides the method of any one of Embodiments 1-7, wherein the feed gas heat exchanger and the process heat exchanger are parts of a turbine inlet chilling system (TIC).

Embodiment 9 provides the method of any one of Embodiments 1-8, wherein the process heat exchanger comprises a condenser of a refrigeration cycle.

Embodiment 10 provides the method of any one of Embodiments 1-9, wherein the process heat exchanger is a chiller that moves thermal energy from the heated process fluid to the hygroscopic working fluid via a chiller working fluid.

Embodiment 11 provides the method of Embodiment 10, wherein the chiller comprises a compressor that compresses a chiller working fluid prior to transferring thermal energy from the compressed chiller working fluid to the hygroscopic working fluid.

Embodiment 12 provides the method of Embodiment 11, wherein the chiller transfers heat directly from the compressed chiller working fluid to the hygroscopic working fluid without any intermediate heat exchangers and without any intermediate heat transfer medium.

Embodiment 13 provides the method of any one of Embodiments 11-12, wherein the chiller comprises a valve that allows the chiller working fluid to expand prior to transferring thermal energy from the heated process fluid to the expanded chiller working fluid.

Embodiment 14 provides the method of any one of Embodiments 1-13, wherein the condensing of the liquid from the feed gas provides sufficient condensate to make up for water lost from the hygroscopic working fluid to the cooling gas composition in the fluid-air contactor, providing at least water-neutral operation.

Embodiment 15 provides the method of any one of Embodiments 1-14, wherein a rate of formation of the condensed liquid is equal to or greater than a rate than a rate of moisture mass transfer between the hygroscopic working fluid and the cooling gas composition in the fluid-air contactor.

Embodiment 16 provides the method of any one of Embodiments 1-15, wherein over 24 hours, the total amount of the condensate generated by the method is equal to or exceeds the total amount of water lost from the hygroscopic working fluid during the method.

Embodiment 17 provides the method of any one of Embodiments 1-16, further comprising storing the cooled process fluid in a process fluid storage area for a period of time before placing the cooled process fluid in the feed gas heat exchanger.

Embodiment 18 provides the method of Embodiment 17, wherein the period of time the cooled process fluid is stored for is about 1 minute to about 7 days.

Embodiment 19 provides the method of any one of Embodiments 1-18, further comprising storing the condensate for a period of time prior to adding the condensate to the hygroscopic working fluid.

Embodiment 20 provides the method of Embodiment 19, wherein the period of time the condensate is stored for is about 1 minute to about 10 years.

Embodiment 21 provides the method of any one of Embodiments 1-20, further comprising maintaining the hygroscopic working fluid to prevent crystallization of the desiccant from the desiccant-based hygroscopic working fluid.

Embodiment 22 provides the method of any one of Embodiments 1-21, wherein the cooling gas composition comprises the ambient atmosphere.

Embodiment 23 provides the method of any one of Embodiments 1-22, wherein the cooling gas composition comprises a gas having more water vapor than the ambient atmosphere, a gas having less water vapor than the ambient atmosphere, or a combination thereof.

Embodiment 24 provides the method of Embodiment 23, wherein the gas having more or less water vapor than the ambient atmosphere comprises at least one ambient air into which water has been evaporated by misting or spraying, an exhaust stream from a drying process, an exhaust stream of high-humidity air displaced during ventilation of conditioned indoor spaces, an exhaust stream from a wet evaporative cooling tower, and a flue gas stream from a combustion source and the associated flue gas treatment systems.

Embodiment 25 provides the method of any one of Embodiments 1-24, wherein dissipating thermal energy from the hygroscopic working fluid to the cooling gas composition comprises dissipating thermal energy from the hygroscopic working fluid to the ambient atmosphere using the fluid-air contactor and dissipating thermal energy from the hygroscopic working fluid to a gas having either less water vapor or more water vapor than the ambient atmosphere using the fluid-air contactor.

Embodiment 26 provides the method of any one of Embodiments 1-25, wherein transferring moisture between the hygroscopic working fluid and the cooling gas composition comprises transferring moisture between the hygroscopic working fluid and the ambient atmosphere using the fluid-air contactor and transferring between the hygroscopic working fluid and a gas having either less water vapor or more water vapor than the ambient atmosphere using the fluid-air contactor.

Embodiment 27 provides the method of any one of Embodiments 1-26, wherein the hygroscopic working fluid is a low-volatility hygroscopic working fluid.

Embodiment 28 provides the method of any one of Embodiments 1-27, wherein the hygroscopic working fluid comprises an aqueous solution comprising at least one of sodium chloride (NaCl), calcium chloride ($CaCl_2$)), magnesium chloride ($MgCl_2$), lithium chloride (LiCl), lithium bromide (LiBr), zinc chloride ($ZnCl_2$), sulfuric acid ($H_2SO_4$), sodium hydroxide (NaOH), sodium sulfate ($Na_2SO_4$), potassium chloride (KCl), calcium nitrate ($Ca[NO_3]_2$), potassium carbonate ($K_2CO_3$), ammonium nitrate ($NH_4NO_3$), ethylene glycol, diethylene glycol, propylene glycol, triethylene glycol, dipropylene glycol, and any combination thereof.

Embodiment 29 provides the method of any one of Embodiments 1-28, wherein the hygroscopic working fluid comprises an aqueous solution comprising calcium chloride ($CaCl_2$)).

Embodiment 30 provides the method of any one of Embodiments 1-29, wherein the fluid-air contactor operates in at least one relative motion including countercurrent, cocurrent, or crossflow operation.

Embodiment 31 provides the method of any one of Embodiments 1-30, wherein the fluid-air contactor is enhanced by at least one of forced or induced draft of the cooling gas composition by a powered fan, natural convection airflow generated from buoyancy differences between heated and cooled air, and induced flow of the cooling gas composition generated by the momentum transfer of sprayed working fluid into the cooling gas composition.

Embodiment 32 provides the method of any one of Embodiments 1-31, wherein the cooling gas composition comprises humidity from at least one of a spray, mist, or fog of water directly into the cooling gas composition, an exhaust gas stream from a drying process, an exhaust gas stream consisting of high-humidity rejected air displaced during the ventilation of conditioned indoor spaces, an exhaust airstream from a wet evaporative cooling tower, and an exhaust flue gas stream from a combustion source.

Embodiment 33 provides the method of any one of Embodiments 1-32, wherein the feed gas comprises humidity from at least one of a spray, mist, or fog of water directly into the feed gas composition, an exhaust gas stream from a drying process, an exhaust gas stream consisting of high-humidity rejected air displaced during the ventilation of conditioned indoor spaces, an exhaust airstream from a wet evaporative cooling tower, and an exhaust flue gas stream from a combustion source.

Embodiment 34 provides the method of any one of Embodiments 1-33, wherein the heat transfer from the feed gas is enhanced by addition of moisture to the hygroscopic working fluid using at least one of:
direct addition of liquid water to the hygroscopic working fluid;
absorption of relatively pure water directly into the hygroscopic fluid through the forward osmosis membrane of a forward osmosis water extraction cell;
absorption of vapor-phase moisture by the working fluid from a moisture-containing gas stream outside of the process air contactor where the moisture-containing gas stream including at least one of ambient air into which water has been evaporated by spraying or misting flue gas from a combustion source and its associated flue gas treatment equipment;
exhaust gas from a drying process;
rejected high-humidity air displaced during ventilation of conditioned indoor air; and
an exhaust airstream from a wet evaporative cooling tower.

Embodiment 35 provides the method of any one of Embodiments 1-34, wherein the process heat exchanger is cooled by a flowing film of the hygroscopic working fluid enabling both sensible and latent heat transfer to occur the transferring of thermal energy from the heated process fluid.

Embodiment 36 provides the method of Embodiment 35, wherein the process heat exchanger is placed at the inlet to the fluid-air contactor for raising humidity levels of the cooling gas composition.

Embodiment 37 provides the method of any one of Embodiments 35-36, wherein the process heat exchanger is placed at the outlet of said air contactor for lowering humidity of the cooling gas composition.

Embodiment 38 provides the method of any one of Embodiments 1-37, wherein transferring moisture between the hygroscopic working fluid and the cooling gas composition comprises using a working fluid-air contactor and a vacuum evaporator.

Embodiment 39 provides the method of any one of Embodiments 1-38, wherein transferring moisture between the hygroscopic working fluid and the cooling gas composition comprises the use of a forward osmosis membrane of a forward osmosis water extraction cell.

Embodiment 40 provides a method for heat dissipation using a hygroscopic working fluid, the method comprising:
transferring thermal energy from a heated process fluid to the hygroscopic working fluid in a process heat exchanger, to form a cooled process fluid;
transferring thermal energy from the feed gas to the cooled process fluid in a feed gas heat exchanger, to form a cooled feed gas and the heated process fluid;
feeding the cooled feed gas to a combustion turbine;
dissipating thermal energy from the hygroscopic working fluid to a cooling gas composition with a fluid-air contactor; and
transferring moisture between the hygroscopic working fluid and the cooling gas composition with the fluid-air contactor.

Embodiment 41 provides a method for heat dissipation using a hygroscopic working fluid, the method comprising:
transferring thermal energy from a heated process fluid to the hygroscopic working fluid in a chiller, to form a cooled process fluid;
condensing liquid from a feed gas on a heat transfer surface of a feed gas heat exchanger in contact with the cooled process fluid, to form a cooled feed gas, the heated process fluid, and a condensate, wherein
the chiller comprises a compressor that compresses a chiller working fluid prior to transferring thermal energy from the compressed chiller working fluid to the hygroscopic working fluid, and
the chiller comprises a valve that allows the chiller working fluid to expand prior to transferring thermal energy from the heated process fluid to the expanded chiller working fluid;
feeding the cooled feed gas to a combustion turbine;
dissipating thermal energy from the hygroscopic working fluid to a cooling gas composition with a fluid-air contactor, the cooling gas composition comprising the ambient atmosphere;
transferring moisture between the hygroscopic working fluid and the cooling gas composition with the fluid-air contactor; and
adding at least part of the condensate to the hygroscopic working fluid;
wherein the condensing of the liquid from the feed gas provides sufficient condensate to make up for water lost from the hygroscopic working fluid to the cooling gas composition in the fluid-air contactor, providing at least water-neutral operation.

Embodiment 42 provides a system for heat dissipation using a hygroscopic working fluid, the system comprising:

a process heat exchanger configured to transfer thermal energy from a heated process fluid to a hygroscopic working fluid to form a cooled process fluid;

a feed gas heat exchanger configured to condense liquid from a feed gas on a heat transfer surface of the feed gas heat exchanger in contact with the cooled process fluid, to form a cooled feed gas, the heated process fluid, and a condensate;

and a fluid-air contactor configured to dissipate heat from the hygroscopic working fluid to a cooling gas composition, and configured to transfer moisture between the hygroscopic working fluid and the cooling gas composition;

wherein the system is configured to add at least part of the condensate to the hygroscopic working fluid.

Embodiment 43 provides the system of Embodiment 42, wherein the feed gas heat exchanger and the process heat exchanger are parts of a turbine inlet chilling system (TIC).

Embodiment 44 provides the system of any one of Embodiments 42-43, wherein the process heat exchanger comprises a condenser of a refrigeration cycle.

Embodiment 45 provides the system of any one of Embodiments 42-44, wherein the process heat exchanger is a chiller that moves thermal energy from the heated process fluid to the hygroscopic working fluid via a chiller working fluid.

Embodiment 46 provides the system of Embodiment 45, wherein the chiller comprises a compressor that is configured to compress a chiller working fluid prior to transferring thermal energy from the compressed chiller working fluid to the hygroscopic working fluid.

Embodiment 47 provides the system of Embodiment 46, wherein the chiller is configured to transfer heat directly from the compressed chiller working fluid to the hygroscopic working fluid without any intermediate heat exchangers and without any intermediate heat transfer medium.

Embodiment 48 provides the system of any one of Embodiments 46-47, wherein the chiller comprises a valve that is configured to allow the chiller working fluid to expand prior to transferring thermal energy from the heated process fluid to the expanded chiller working fluid.

Embodiment 49 provides the system of any one of Embodiments 42-48, wherein the system is configured to operate in at least water-neutral operation with respect to moisture loss from the hygroscopic working fluid and moisture gain from the condensate.

Embodiment 50 provides the system of any one of Embodiments 42-49, further comprising a process fluid storage area configured to store the cooled process fluid for a period of time before placing the cooled process fluid in the feed gas heat exchanger.

Embodiment 51 provides the system of any one of Embodiments 1-50, wherein the system is configured to maintain the hygroscopic working fluid to prevent crystallization of the desiccant from the desiccant-based hygroscopic working fluid.

Embodiment 52 provides the method or system of any one or any combination of Embodiments 1-51 optionally configured such that all elements or options recited are available to use or select from.

The invention claimed is:

1. A method for heat dissipation using a hygroscopic working fluid, the method comprising:

transferring thermal energy from a heated process fluid to the hygroscopic working fluid in a process heat exchanger, to form a cooled process fluid;

condensing liquid from a feed gas on a heat transfer surface of a feed gas heat exchanger in contact with the cooled process fluid, to form a cooled feed gas, the heated process fluid, and a condensate;

collecting the condensate in a feed gas heat exchanger condensate-collection basin;

transferring the condensate from the feed gas heat exchanger condensate-collection basin to a condensate storage tank, to form a stored condensate in the condensate storage tank dissipating thermal energy from the hygroscopic working fluid to a cooling gas composition with a fluid-air contactor;

transferring moisture between the hygroscopic working fluid and the cooling gas composition with the fluid-air contactor, wherein the fluid-air contactor collects the hygroscopic working fluid in a fluid-air contactor hygroscopic working fluid-collection basin after it has contacted the cooling gas composition in the fluid-air contactor;

adding at least part of the condensate to the hygroscopic working fluid;

transferring the hygroscopic working fluid from the fluid-air contactor hygroscopic working fluid-collection basin to the process heat exchanger;

operating the process heat exchanger at night or other off-peak hours when power demand is low comprising storing the cooled process fluid in a process fluid storage tank for subsequent conveyance to the feed gas exchanger and providing the stored condensate from the condensate storage tank to the hygroscopic working fluid, wherein providing the stored condensate from the condensate storage tank to the hygroscopic working fluid comprises providing the stored condensate from the condensate storage tank to the fluid-air contactor hygroscopic working fluid-collection basin; and decoupling the process heat exchanger at daytime or other peak hours when power demand is high comprising performing the transferring of the condensate from the feed gas heat exchanger condensate-collection basin to the condensate storage tank and providing the cooled process fluid from the process fluid storage tank to the feed gas heat exchanger.

2. The method of claim 1, wherein the condensing of the liquid from the feed gas comprises transferring thermal energy from the feed gas to the cooled process fluid.

3. The method of claim 1, further comprising feeding the cooled feed gas to a rotary mechanical device.

4. The method of claim 1, wherein the feed gas comprises the ambient atmosphere, a gas having more water vapor than the ambient atmosphere, a gas having less water vapor than the ambient atmosphere, or a combination thereof.

5. The method of claim 1, wherein the process heat exchanger is a chiller that moves thermal energy from the heated process fluid to the hygroscopic working fluid via a chiller working fluid.

6. The method of claim 5, wherein the chiller comprises a compressor that compresses a chiller working fluid prior to transferring thermal energy from the compressed chiller working fluid to the hygroscopic working fluid.

7. The method of claim 5, wherein the chiller comprises a valve that allows the chiller working fluid to expand prior to transferring thermal energy from the heated process fluid to the expanded chiller working fluid.

8. The method of claim 1, wherein the feed gas has sufficient humidity such that the condensing of the liquid from the feed gas provides sufficient condensate to make up for water lost from the hygroscopic working fluid during the method, providing at least water-neutral operation.

9. The method of claim 1, further comprising storing the cooled process fluid in a process fluid storage area for a period of time before placing the cooled process fluid in the feed gas heat exchanger.

10. The method of claim 1, further comprising maintaining the hygroscopic working fluid to prevent crystallization of the desiccant from the desiccant-based hygroscopic working fluid.

11. The method of claim 1, wherein the cooling gas composition comprises the ambient atmosphere.

12. The method of claim 1, wherein the cooling gas composition comprises a gas having more water vapor than the ambient atmosphere, a gas having less water vapor than the ambient atmosphere, or a combination thereof.

13. The method of claim 1, wherein dissipating thermal energy from the hygroscopic working fluid to the cooling gas composition comprises dissipating thermal energy from the hygroscopic working fluid to the ambient atmosphere using the fluid-air contactor and dissipating thermal energy from the hygroscopic working fluid to a gas having either less water vapor or more water vapor than the ambient atmosphere using the fluid-air contactor.

14. The method of claim 1, wherein transferring moisture between the hygroscopic working fluid and the cooling gas composition comprises transferring moisture between the hygroscopic working fluid and the ambient atmosphere using the fluid-air contactor and transferring moisture between the hygroscopic working fluid and a gas having either less water vapor or more water vapor than the ambient atmosphere using the fluid-air contactor.

15. The method of claim 1, wherein the hygroscopic working fluid comprises an aqueous solution comprising at least one of sodium chloride (NaCl), calcium chloride ($CaCl_2$), magnesium chloride ($MgCl_2$), lithium chloride (LiCl), lithium bromide (LiBr), zinc chloride ($ZnCl_2$), sulfuric acid ($H_2SO_4$), sodium hydroxide (NaOH), sodium sulfate ($Na_2SO_4$), potassium chloride (KCl), calcium nitrate ($Ca[NO_3]_2$), potassium carbonate ($K_2CO_3$), ammonium nitrate ($NH_4NO_3$), ethylene glycol, diethylene glycol, propylene glycol, triethylene glycol, dipropylene glycol, and any combination thereof.

16. The method of claim 1, wherein the fluid-air contactor is enhanced by at least one of forced or induced draft of the cooling gas composition by a powered fan, natural convection airflow generated from buoyancy differences between heated and cooled air, and induced flow of the cooling gas composition generated by the momentum transfer of sprayed working fluid into the cooling gas composition.

17. The method of claim 1, wherein the feed gas comprises humidity from at least one of a spray, mist, or fog of water directly into the feed gas composition, an exhaust gas stream from a drying process, an exhaust gas stream consisting of high-humidity rejected air displaced during the ventilation of conditioned indoor spaces, an exhaust airstream from a wet evaporative cooling tower, and an exhaust flue gas stream from a combustion source.

18. The method of claim 1, wherein the stored condensate in the condensate storage tank is free of the heated and cooled process fluids.

19. The method of claim 1, wherein the feed gas heat exchanger comprises a condenser that comprises the heat transfer surface on an exterior thereof, and wherein the cooled process fluid is within the condenser, wherein the condenser comprises a cooling coil, wherein the cooled process fluid is within the cooling coil.

20. The method of claim 1, wherein the fluid-air contactor is a falling-film heat exchanger comprising one or more falling film wicks, wherein the fluid-air contactor hygroscopic working fluid-collection basin has a liquid level below a bottom of the falling film wicks.

21. A method for heat dissipation using a hygroscopic working fluid, the method comprising:
transferring thermal energy from a heated process fluid to the hygroscopic working fluid in a chiller, to form a cooled process fluid;
condensing liquid from a feed gas on a heat transfer surface of a feed gas heat exchanger in contact with the cooled process fluid, to form a cooled feed gas, the heated process fluid, and a condensate, wherein
the chiller comprises a compressor that compresses a chiller working fluid prior to transferring thermal energy from the compressed chiller working fluid to the hygroscopic working fluid, and
the chiller comprises a valve that allows the chiller working fluid to expand prior to transferring thermal energy from the heated process fluid to the expanded chiller working fluid;
collecting the condensate in a feed gas heat exchanger condensate-collection basin;
transferring the condensation from the feed gas heat exchanger condensate-collection basin to a condensate storage tank, to form a stored condensate in the condensate storage tank;
feeding the cooled feed gas to a combustion turbine;
dissipating thermal energy from the hygroscopic working fluid to a cooling gas composition with a fluid-air contactor, the cooling gas composition comprising the ambient atmosphere;
transferring moisture between the hygroscopic working fluid and the cooling gas composition with the fluid-air contactor, wherein the fluid-air contactor collects the hygroscopic working fluid in a fluid-air contactor hygroscopic working fluid-collection basin after it has contacted the cooling gas composition in the fluid-air contactor; and
adding at least part of the stored condensate from the condensate storage tank to the hygroscopic working fluid;
transferring the hygroscopic working fluid from the fluid-air contactor hygroscopic working fluid-collection basin to the process heat exchanger;
further comprising
operating the chiller at night or other off-peak hours when power demand is low comprising storing the cooled process fluid in a process fluid storage tank and providing the stored condensate from the condensate storage tank to the hygroscopic working fluid; and
decoupling the chiller at daytime or other peak hours when power demand is high comprising performing the transferring of the condensate from the feed gas heat exchanger condensate-collection basin to the condensate storage tank and providing the cooled process fluid from the process fluid storage tank to the feed gas heat exchanger.

22. A system for heat dissipation using a hygroscopic working fluid, the system comprising:
a process heat exchanger configured to transfer thermal energy from a heated process fluid to a hygroscopic working fluid to form a cooled process fluid;
a feed gas heat exchanger configured to condense liquid from a feed gas on a heat transfer surface of the feed gas heat exchanger in contact with the cooled process fluid, to form a cooled feed gas, the heated process fluid, and a condensate, wherein the feed gas heat exchanger comprises a feed gas heat exchanger condensate-collection basin that collects the condensate;

a condensate storage tank configured to store the condensate collected by the feed gas heat exchanger condensate-collection basin, to form a stored condensate; and a fluid-air contactor configured to dissipate heat from the hygroscopic working fluid to a cooling gas composition, and configured to transfer moisture between the hygroscopic working fluid and the cooling gas composition, wherein the fluid-air contactor is configured to collect the hygroscopic working fluid in a fluid-air contactor hygroscopic working fluid-collection basin after it has contacted the cooling gas composition in the fluid-air contactor, and wherein the fluid-air contactor is configured to transfer the hygroscopic working fluid from the fluid-air contactor hygroscopic working fluid-collection basin to the process heat exchanger;

wherein the system is configured to:

operate the process heat exchanger at night or other off-peak hours when power demand is low comprising storing the cooled process fluid in a process fluid storage tank for subsequent conveyance to the feed gas exchanger and providing the stored condensate from the condensate storage tank to the hygroscopic working fluid; and decouple the process heat exchanger at daytime or other peak hours when power demand is high comprising transferring the condensate from the feed gas heat exchanger condensate-collection basin to the condensate storage tank and providing the cooled process fluid from the process fluid storage tank to the feed gas heat exchanger.

* * * * *